United States Patent
Sodeyama

(10) Patent No.: US 11,424,477 B2
(45) Date of Patent: Aug. 23, 2022

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 256 days.

(21) Appl. No.: 16/692,453

(22) Filed: Nov. 22, 2019

(65) Prior Publication Data

US 2020/0091551 A1 Mar. 19, 2020

Related U.S. Application Data

(63) Continuation of application No. PCT/JP2018/016088, filed on Apr. 19, 2018.

(30) Foreign Application Priority Data

Jun. 15, 2017 (JP) .............................. JP2017-117808

(51) Int. Cl.
*H01M 10/0525* (2010.01)
*H01M 10/0568* (2010.01)
(Continued)

(52) U.S. Cl.
CPC ... *H01M 10/0525* (2013.01); *H01M 10/0568* (2013.01); *H01M 10/425* (2013.01);
(Continued)

(58) Field of Classification Search
None
See application file for complete search history.

(56) References Cited

U.S. PATENT DOCUMENTS

2006/0275657 A1 12/2006 Kozuki et al.
2011/0008654 A1 1/2011 Kim et al.

FOREIGN PATENT DOCUMENTS

CN 104779381 7/2015
JP 2006351512 A 12/2006
(Continued)

OTHER PUBLICATIONS

Machine translation of Japanese Patent Publication No. 2009110808 (Year: 2009).*

(Continued)

*Primary Examiner* — Wyatt P McConnell
(74) *Attorney, Agent, or Firm* — K&L Gates LLP

(57) ABSTRACT

A secondary battery includes a battery element including a positive electrode, a negative electrode, and an electrolytic solution, a housing member having an open end and configured to accommodate the battery element, and a safety valve mechanism attached to the housing member and configured to close the open end. The safety valve mechanism includes a closing member and a coupling member disposed between the battery element and the closing member. The coupling member is electrically coupled to both of a wound electrode body and the closing member, and has a coupling portion physically coupled to the closing member, and a groove is provided in at least part of a peripheral region of the coupling portion.

12 Claims, 9 Drawing Sheets

(51) Int. Cl.
     *H01M 10/42*    (2006.01)
     *H01M 50/30*    (2021.01)
     *H01M 50/538*   (2021.01)
     *H01M 4/02*         (2006.01)

(52) U.S. Cl.
     CPC ......... *H01M 50/30* (2021.01); *H01M 50/538* (2021.01); *H01M 2004/027* (2013.01); *H01M 2004/028* (2013.01)

(56) References Cited

FOREIGN PATENT DOCUMENTS

| JP | 2009110808 A | 5/2009 |
| JP | 2009193862 A | 8/2009 |
| JP | 2012506107 A | 3/2012 |

OTHER PUBLICATIONS

International Search Report for Application No. PCT/JP2018/016088, dated Jul. 10, 2018.
Chinese Office Action dated Oct. 29, 2021 in corresponding Chinese Application No. 201880036348.2.

\* cited by examiner

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

The present application is a continuation of PCT patent application no. PCT/JP2018/016088, filed on Apr. 19, 2018, which claims priority to Japanese patent application no. JP2017-117808 filed on Jun. 15, 2017, the entire contents of which are being incorporated herein by reference.

BACKGROUND

The present technology generally relates to a secondary battery including a safety valve mechanism and to a battery pack, an electric vehicle, an electric power storage system, an electric power tool, and an electronic apparatus that use the secondary battery.

Various electronic apparatuses such as mobile phones have been widely used, and there has been a demand to reduce the size and weight of electronic apparatuses and to achieve a long service life. Thus, as an electric power source for electronic apparatuses, a small and light-weight secondary battery capable of providing a high energy density has been developed.

It has been considered to apply a secondary battery not only to the foregoing electronic apparatuses, but also to other applications. Examples of other applications include a battery pack detachably mounted in electronic apparatuses or the like, an electric vehicle such as an electric automobile, an electric power storage system such as a domestic power generator, and an electric power tool such as an electric drill.

The secondary battery includes a positive electrode, a negative electrode, and an electrolytic solution. In addition, the secondary battery includes a safety valve mechanism capable of discharging gas to the outside as necessary when gas is generated due to, for example, a decomposition reaction of the electrolytic solution and occurrence of a problem due to the gas needs to be suppressed.

A configuration of the safety valve mechanism may largely influence safety of the secondary battery, and various considerations have thus been given to the configuration of the safety valve mechanism.

SUMMARY

The present technology generally relates to a secondary battery including a safety valve mechanism and to a battery pack, an electric vehicle, an electric power storage system, an electric power tool, and an electronic apparatus that use the secondary battery.

Electronic apparatuses and the like are increasingly achieving higher performance and multi-functionality. Accordingly, the frequency of use of electronic apparatuses and the like increases, and a use environment of the electronic apparatuses and the like expands. Thus, there is still room for improvement in the safety of secondary batteries.

The present technology is made in view of the above-described issues and aims to provide a secondary battery, a battery pack, an electric vehicle, an electric power storage system, an electric power tool, and an electronic apparatus each of which has improved safety.

According to an embodiment of the present disclosure, a secondary battery is provided. The secondary battery includes a battery element including a positive electrode, a negative electrode, and an electrolytic solution, a housing member having an open end and configured to accommodate the battery element, and a safety valve mechanism attached to the housing member to close the open end. The safety valve mechanism includes a closing member configured to close the open end and a coupling member disposed between the battery element and the closing member. The coupling member is electrically coupled to both of a wound electrode body and the closing member, and has a coupling portion physically coupled to the closing member and a groove is provided in at least part of a peripheral region of the coupling portion.

Each of a battery pack, an electric vehicle, an electric power storage system, an electric power tool, and an electronic apparatus according to an embodiment of the present technology includes a secondary battery, and the secondary battery has a configuration similar to the secondary battery of the embodiments as described herein.

According to the secondary battery of an embodiment of the present technology, in the coupling member, at least part of the peripheral region of the coupling portion physically coupled to the closing member includes the groove, and as a result, safety can be improved. In addition, the same effect can be provided in each of the battery pack, the electric vehicle, the electric power storage system, the electric power tool, and the electronic apparatus of an embodiment of the present technology.

The effects described herein are non-limiting, and may be any one of the effects described in the present technology.

DETAILED DESCRIPTION

As described herein, the present disclosure will be described based on examples with reference to the drawings, but the present disclosure is not to be considered limited to the examples, and various numerical values and materials in the examples are considered by way of example.

First, a secondary battery of an embodiment of the present technology is described.

The secondary battery described here is, for example, a secondary battery using lithium as an electrode reactant, and more specifically, the secondary battery is a lithium ion secondary battery in which battery capacity (capacitance of a negative electrode) is obtained using a lithium absorption phenomenon and a lithium release phenomenon. The "electrode reactant" is a substance involved in an electrode reaction (charge/discharge reaction).

First, an overall configuration of the secondary battery will be described.

Figure 1:
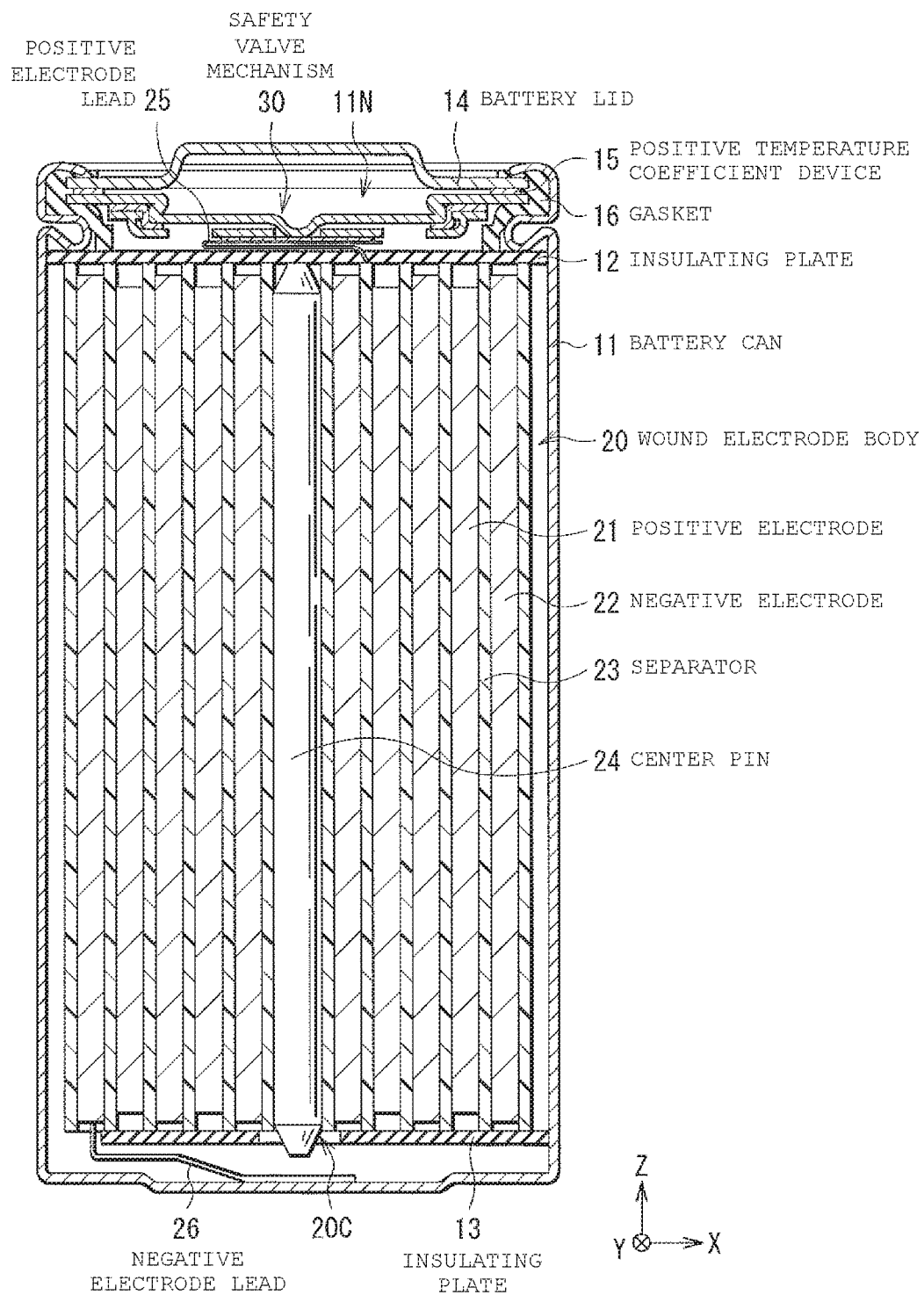
FIG. 1 is a sectional view illustrating a configuration of a secondary battery according to an embodiment of the present technology.

FIG. 1 illustrates a sectional configuration of a secondary battery. For example, as illustrated in FIG. 1, the secondary battery includes a wound electrode body 20 which is a battery element inside a battery can 11. The battery can 11 is a "housing member" in an embodiment of the present technology, and the wound electrode body 20 is a "battery element" in an embodiment of the present technology.

The secondary battery described herein is, for example, a cylindrical secondary battery using the battery can 11. In the cylindrical secondary battery, for example, a pair of insulating plates 12 and 13 and a positive temperature coefficient (PTC) device 15 are housed inside the columnar battery can 11 together with the wound electrode body 20 described above. A safety valve mechanism 30 is attached to the battery can 11, and the battery can 11 is hermetically sealed by, for example, a battery lid 14.

The battery can 11 has a hollow structure in which one end thereof is closed and the other end thereof (open end 11N) is open, and contains, for example, one or two or more metal materials such as iron and aluminum and their alloys. One or two or more metal materials such as nickel may be plated onto the surface of the battery can 11, for example. At the open end 11N of the battery can 11, for example, the battery lid 14, the positive temperature coefficient device 15, and the safety valve mechanism 30 are crimped with a gasket 16.

The pair of insulating plates 12 and 13 is, for example, disposed to extend in a direction perpendicular to a spirally wound peripheral surface of the wound electrode body 20 and sandwich the wound electrode body 20 in between.

The battery lid 14 is a member that mainly seals the battery can 11 and contains, for example, a material similar to a material for forming the battery can 11.

The positive temperature coefficient device 15 includes a resistor (thermistor) whose electrical resistance changes significantly in response to a change in temperature. When a temperature inside the secondary battery exceeds a predetermined temperature, the electrical resistance of the positive temperature coefficient device 15 rapidly increases in order to prevent, for example, abnormal heat generation of the secondary battery due to a large current.

The safety valve mechanism 30 is attached to the battery can 11 so as to close the open end 11N. The safety valve mechanism 30 is, for example, disposed between the battery lid 14 and the wound electrode body 20 and electrically coupled to the battery lid 14 with the positive temperature coefficient device 15 interposed therebetween. Consequently, the battery can 11 is sealed by the battery lid 14 in a state in which the safety valve mechanism 30 is housed inside the battery can 11 together with the wound electrode body 20. A detailed configuration of the safety valve mechanism 30 will be described later (see FIGS. 2 to 5).

The gasket 16 contains, for example, one or two or more insulating materials. A surface of the gasket 16 may be coated with one or two or more asphalt and the like, for example.

The wound electrode body 20 includes, for example, a positive electrode 21, a negative electrode 22, a separator 23, and an electrolytic solution which is a liquid electrolyte. For example, after the positive electrode 21 and the negative electrode 22 are stacked with the separator 23 interposed therebetween, the stacked positive electrode 21, negative electrode 22, and separator 23 are wound to form the wound electrode body 20. For example, each of the positive electrode 21, the negative electrode 22, and the separator 23 is impregnated with the electrolytic solution. A detailed configuration of the wound electrode body 20 will be described later (see FIG. 6).

At the center of the wound electrode body 20, for example, a space (winding space 20C) generated when the positive electrode 21, the negative electrode 22, and the separator 23 are wound is provided, and, for example, a center pin 24 is inserted into the winding space 20C. However, the center pin 24 may be omitted.

A positive electrode lead 25 is coupled to the positive electrode 21. The positive electrode lead 25 is housed inside the battery can 11 together with the positive electrode 21 and contains, for example, one or two or more conductive materials, such as aluminum. For example, the positive electrode lead 25 may be physically coupled to the safety valve mechanism 30 (sub-disc 34 described later) and therefore electrically coupled to the battery lid 14.

A negative electrode lead 26 is coupled to the negative electrode 22. The negative electrode lead 26 is housed inside the battery can 11 together with the negative electrode 22 and contains, for example, one or two or more conductive materials, such as nickel. For example, the negative electrode lead 26 may be physically coupled to the battery can 11 and therefore electrically coupled to the battery can 11.

Next, a configuration of the safety valve mechanism 30 will be described.

Figure 2:
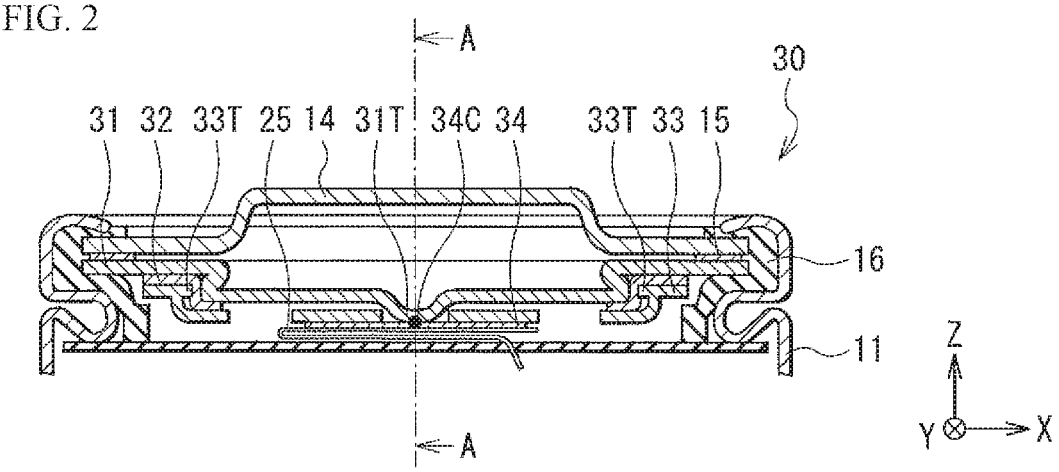
FIG. 2 is an enlarged sectional view of a configuration of a safety valve mechanism illustrated in FIG. 1.
Figure 3:
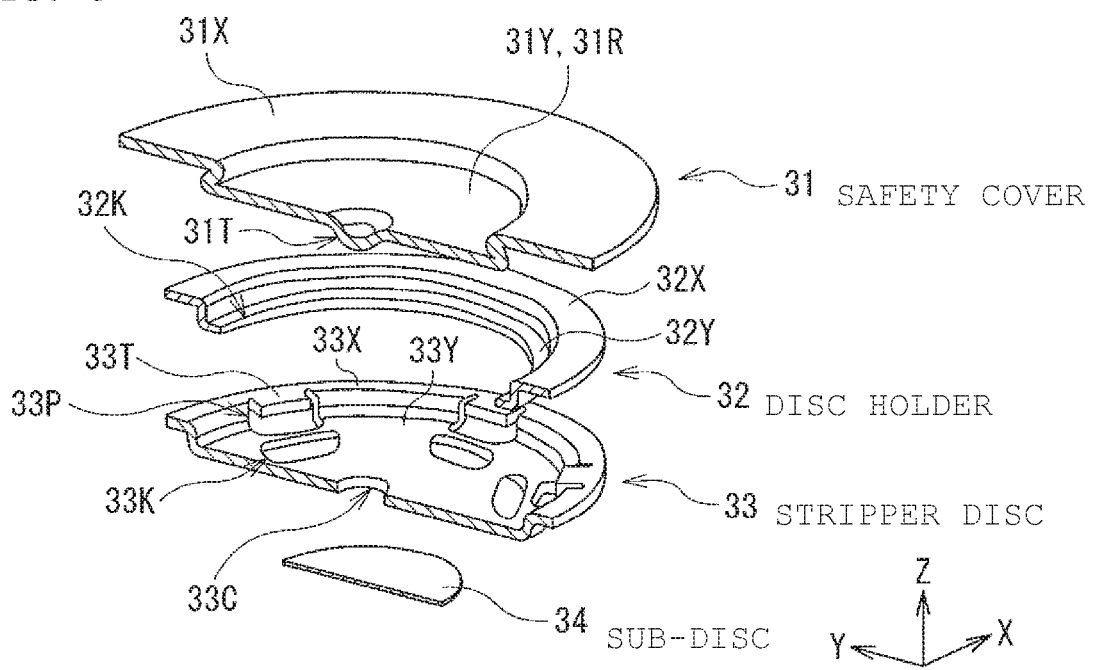
FIG. 3 is a perspective sectional view illustrating a configuration of a major portion of the safety valve mechanism illustrated in FIG. 2.

FIG. 2 illustrates an enlarged sectional configuration of the safety valve mechanism 30 illustrated in FIG. 1, and FIG. 3 illustrates a perspective sectional configuration of a major portion (a safety cover 31, a disc holder 32, a stripper disc 33, and a sub-disc 34) of the safety valve mechanism 30 illustrated in FIG. 2.

However, in FIG. 2, together with the safety valve mechanism 30, constituent elements (such as the battery can 11) around the safety valve mechanism 30 are also illustrated.

Further, FIG. 3 illustrates respective sections of the safety cover 31, the disc holder 32, the stripper disc 33, and the sub-disc 34 along line A-A illustrated in FIG. 2. In this case, a state in which the safety cover 31, the disc holder 32, the stripper disc 33, and the sub-disc 34 are spaced apart from each other is shown.

For example, as illustrated in FIGS. 2 and 3, the safety valve mechanism 30 includes the safety cover 31, the disc holder 32, the stripper disc 33, and the sub-disc 34. The safety cover 31 is a "closing member" in an embodiment of the present technology, the stripper disc 33 is an "intermediate member" in an embodiment of the present technology, and the sub-disc 34 is a "coupling member" in an embodiment of the present technology.

The safety cover 31, the disc holder 32, the stripper disc 33, and the sub-disc 34 may be arranged in this order from the side farther from the wound electrode body 20 (the side closer to the battery lid 14), for example.

The safety cover 31 is a member that mainly closes the open end 11N and open in response to an increase in the internal pressure of the battery can 11. The internal pressure of the battery can 11 increases due to a side reaction such as a decomposition reaction of the electrolytic solution, for example. That is, since a gas such as carbon dioxide is generated inside the battery can 11 when a side reaction such as a decomposition reaction of the electrolytic solution occurs, the internal pressure of the battery can 11 increases according to an increase in the amount of the gas generated.

A plane shape of the safety cover 31 is not particularly limited and is, for example, a circle, a polygon, or another shape. The circular shape is, for example, a true circle (perfect circle), an ellipse, a substantial circle, or the like. The substantial circle is, for example, a generic term for a shape that is a partially or entirely distorted true circle. The polygon is, for example, a triangle, square, pentagons, or hexagon. The other shape is, for example, a shape other than a circle whose outline is formed only by a curve, a shape in which two or more types of polygons are combined, or a shape in which one or more types of circles and one or more types of polygons are combined. The respective definitions of "circle", "polygon", and "other shapes" described here are similarly applicable to the description below. Herein, the planar shape of the safety cover 31 is, for example, a circular shape.

A central region of the safety cover 31 is, for example, recessed toward the disc holder 32. Thus, the safety cover 31 includes, for example, a ring-shaped outer peripheral portion 31X and a central portion 31Y surrounded by the outer peripheral portion 31X. The planar shape of the central portion 31Y is not particularly limited, and is, for example, similar to the planar shape of the safety cover 31. Herein, the planar shape of the central portion 31Y is, for example, a circular shape. The surface of the central portion 31Y is, for example, lower than the surface of the outer peripheral portion 31X so that the central portion 31Y is, for example, closer to the disc holder 32 than the outer peripheral portion 31X is.

The central portion 31Y includes an opening valve portion 31R that can open, as described above, in response to the increase in the internal pressure of the battery can 11. When the internal pressure of the battery can 11 increases to a predetermined level or higher, the opening valve portion 31R is cleaved or removed. Consequently, as described later, an opening 31K is formed in the safety cover 31 (see FIG. 10), and the safety cover 31 opens.

A central portion of the central portion 31Y is, for example, further recessed toward the disc holder 32. Thus, the central portion 31Y is, for example, provided with a protrusion 31T protruding toward the disc holder 32. In other words, the protrusion 31T protrudes toward the sub-disc 34.

The safety cover 31 contains, for example, one or two or more metal materials such as aluminum and aluminum alloys.

The disc holder 32 is a member that is interposed between the safety cover 31 and the stripper disc 33 and thus mainly aligns the stripper disc 33 with respect to the safety cover 31.

A planar shape of the disc holder 32 is not particularly limited and is, for example, similar to the planar shape of the safety cover 31. Herein, the planar shape of the disc holder 32 is, for example, a circular shape.

A central region of the disc holder 32 is, for example, recessed toward the stripper disc 33. Thus, the disc holder 32 includes, for example, a ring-shaped outer peripheral portion 32X and a central portion 32Y surrounded by the outer peripheral portion 32X. A planar shape of the central portion 32Y is not particularly limited and is, for example, similar to the planar shape of the safety cover 31. Herein, the planar shape of the central portion 32Y is, for example, a circular shape. The surface of the central portion 32Y is, for example, lower than the surface of the outer peripheral portion 32X, and the central portion 32Y is thus closer to, for example, the stripper disc 33 than the outer peripheral portion 32X is.

The central portion 31Y of the safety cover 31 is, for example, fitted into a recess provided in the disc holder 32. Thus, the safety cover 31 is aligned with the disc holder 32, and the safety cover 31 is fixed to the disc holder 32.

In the central portion 32Y, a portion corresponding to the central portion 31Y (opening valve portion 31R) of the safety cover 31 is provided with the opening 32K, for example. An opening shape of the opening 32K is not particularly limited and is, for example, similar to the planar shape of the safety cover 31. Herein, the shape of the opening 32K is, for example, a circular shape.

The disc holder 32 contains, for example, one or two or more polymeric materials such as polypropylene (PP) and polybutylene terephthalate (PBT).

The stripper disc 33 is a member that is interposed between the disc holder 32 and the sub-disc 34 and thus mainly discharges a gas generated inside the battery can 11.

A planar shape of the stripper disc 33 is not particularly limited, and is, for example, similar to the planar shape of the safety cover 31. Herein, the planar shape of the stripper disc 33 is, for example, a circular shape.

A central region of the stripper disc 33 is, for example, recessed toward the sub-disc 34. Thus, the stripper disc 33 includes, for example, a ring-shaped outer peripheral portion 33X and a central portion 33Y surrounded by the outer peripheral portion 33X. A planar shape of the central portion 33Y is not particularly limited, and is, for example, similar to the planar shape of the safety cover 31. Herein, the planar shape of the central portion 33Y is, for example, a circular shape. The surface of the central portion 33Y is, for example, lower than the surface of the outer peripheral portion 33X, and the central portion 33Y is thus closer to, for example, the sub-disc 34 than the outer peripheral portion 33X is.

The central portion 32Y of the disc holder 32 is, for example, fitted into a recess provided in the stripper disc 33. Thus, the stripper disc 33 is aligned with the disc holder 32, and the stripper disc 33 is fixed to the disc holder 32.

For example, a plurality of openings 33K are provided in a region of the central portion 33Y facing the opening valve portion 31R. The plurality of openings 33K are vents for mainly discharging the gas generated inside the battery can 11 to the outside of the battery can 11.

The outer peripheral portion 33X is provided with a plurality of protrusions 33T protruding toward the plurality of openings 33K, and the plurality of protrusions 33T are arranged outside the plurality of openings 33K. The plurality of protrusions 33T are mainly used to fix the stripper disc 33 to the disc holder 32. In this case, for example, as illustrated in FIG. 2, an inner surface of the disc holder 32 is pressed against the safety cover 31 due to the plurality of protrusions 33T being pressed against an outer surface of the disc holder 32. Consequently, since a fitting force is generated between part (the plurality of protrusions 33T) of the stripper disc 33 and the safety cover 31 with the disc holder 32 interposed therebetween, the stripper disc 33 is fixed to the disc holder 32 by the fitting force.

Herein, for example, in a range from the outer peripheral portion 33X to the central portion 33Y, the stripper disc 33 is partially removed so that part of the outer peripheral portion 33X remains. Thus, the opening 33P is provided at a portion where the stripper disc 33 is partially removed, and the protrusion 33T is formed by a portion where the outer peripheral portion 33X remains. That is, the plurality of openings 33P are provided in accordance with the plurality of protrusions 33T.

The number of the openings 33K is not particularly limited, and the number of the protrusions 33T is also not particularly limited. Herein, the number of the openings 33K is, for example, six, and the number of the protrusions 33T is, for example, six.

In the central portion 33Y, for example, an opening 33C for the protrusion 31T to pass through is provided at a portion corresponding to the protrusion 31T. The protrusion 31T is physically coupled to the sub-disc 34 by passing through the opening 33C. An opening shape of the opening 33C is not particularly limited, and is, for example, similar to the planar shape of the safety cover 31. Herein, the opening shape of the opening 33C is, for example, a circular shape. The plurality of openings 33K, the plurality of protrusions 33T, and the plurality of openings 33P are, for example, located concentrically with respect to the opening 33C as the center.

The stripper disc 33 contains, for example, one or two or more metal materials such as aluminum and aluminum alloys. A material for forming the stripper disc 33 may be the same as or different from a material for forming the safety cover 31.

The sub-disc 34 is a member that is disposed between the safety cover 31 and the wound electrode body 20 (positive electrode lead 25) and thus mainly electrically couples the safety cover 31 (protrusion 31T) to the wound electrode body 20.

The sub-disc 34 is physically coupled to the protrusion 31T and is thus electrically coupled to the safety cover 31. That is, the sub-disc 34 has a coupling portion 34C physically coupled to the protrusion 31T and is in contact with the protrusion 31T at the coupling portion 34C.

Further, the sub-disc 34 is physically adjacent to the positive electrode lead 25 and is thus electrically coupled to the wound electrode body 20.

A planar shape of the sub-disc 34 is not particularly limited, and is, for example, similar to the planar shape of the safety cover 31. Herein, the planar shape of the sub-disc 34 is, for example, a circular shape.

The sub-disc 34 contains, for example, one or two or more metal materials such as aluminum and aluminum alloys. A material for forming the sub-disc 34 may be the same as or different from a material for forming the safety cover 31.

A detailed configuration of the sub-disc 34 will be described later (see FIGS. 4 and 5).

Next, a configuration of the sub-disc 34 will be described.

Figure 4:
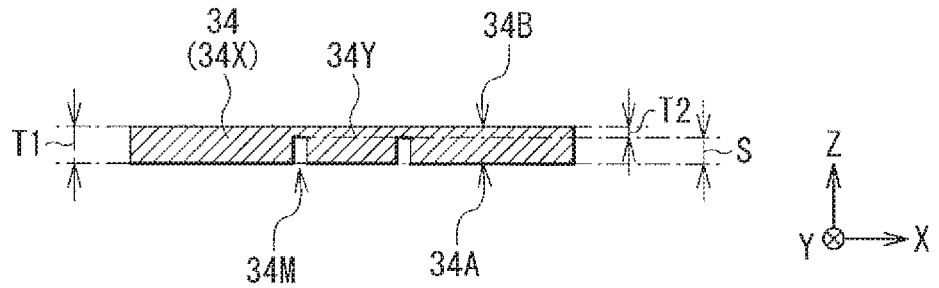
FIG. 4 is an enlarged sectional view of a configuration of a sub-disc illustrated in FIG. 3.
Figure 5:
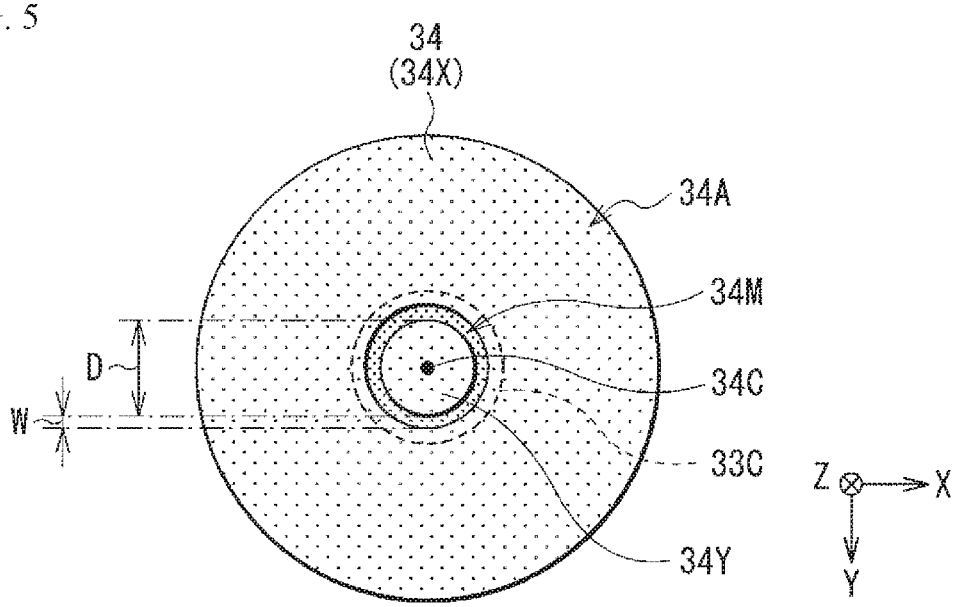
FIG. 5 is an enlarged plan view of a configuration of the sub-disc illustrated in FIG. 3.

Each of FIGS. 4 and 5 illustrates an enlarged configuration of the sub-disc 34 illustrated in FIG. 3. FIG. 4 illustrates a sectional configuration, and FIG. 5 illustrates a plan configuration.

For example, as illustrated in FIGS. 4 and 5, the sub-disc 34 has a lower surface 34A which is a first surface located close to the wound electrode body 20 and an upper surface 34B which is a second surface located close to the safety cover 31.

Herein, the protrusion 31T is physically coupled to the upper surface 34B of the sub-disc 34, as illustrated in FIGS. 2, 4 and 5, for example. Thus, the sub-disc 34 is electrically coupled to the safety cover 31. The method of coupling the protrusion 31T is not particularly limited and includes, for example, a welding method, more specifically, an ultrasonic welding method and the like.

The positive electrode lead 25 is physically coupled to the lower surface 34A of the sub-disc 34, as illustrated in FIGS. 2, 4 and 5, for example. Thus, the sub-disc 34 is electrically coupled to the wound electrode body 20. The method of coupling the positive electrode lead 25 is the same as the method of coupling the protrusion 31T, for example.

In the sub-disc 34, a portion of or the entirety of a peripheral region of the coupling portion 34C includes a cleavage groove 34M which is a groove for cleaving the sub-disc 34 in response to the increase in the internal pressure of the battery can 11. The "peripheral region" of the coupling portion 34C is a region around the coupling portion 34C. Each of a width W and a depth S of the cleavage groove 34M can be set selectively. In FIG. 5, in order to easily identify the cleavage groove 34M, a region where the cleavage groove 34M is formed is shown with dark shading, and the other regions are shown with light shading. In each of FIGS. 2 and 3, illustration of the cleavage groove 34M is omitted in order to simplify illustration.

The cleavage groove 34M is provided in the sub-disc 34 because, when the internal pressure of the battery can 11 increases, the sub-disc 34 cleaves as a result of the cleavage groove 34M, and the sub-disc 34 thus opens. Consequently, when the internal pressure of the battery can 11 increases, the sub-disc 34 can open easily and stably without depending on a coupling strength between the protrusion 31T and the sub-disc 34. Thus, the safety valve mechanism 30 can operate easily with good reproducibility in response to the increase in the internal pressure of the battery can 11, and accordingly, operation stability of the safety valve mechanism 30 is improved.

By providing the cleavage groove 34M in the sub-disc 34, the sub-disc 34 includes, for example, an outer peripheral portion 34X located outside the cleavage groove 34M and a central portion 34Y located inside the cleavage groove 34M.

A configuration of the cleavage groove 34M is not particularly limited as long as the sub-disc 34 can cleave as a result of the cleavage groove 34M in response to the increase in the internal pressure of the battery can 11.

First, a position where the cleavage groove 34M is formed is not particularly limited. Thus, the cleavage groove 34M may be provided in either the lower surface 34A or the upper surface 34B, or in both the lower surface 34A and the upper surface 34B. This is because, when the internal pressure of the battery can 11 increases, the sub-disc 34 can easily cleave as a result of the cleavage groove 34M. Herein, the cleavage groove 34M is provided in the lower surface 34A, for example.

Second, a sectional shape of the cleavage groove 34M is not particularly limited. Thus, the sectional shape of the cleavage groove 34M may be a rectangle, a polygon (except for a rectangle), a curved shape, or any other shape.

The "sectional shape" described here is the sectional shape of the cleavage groove 34M as viewed in a Y-axis direction, as illustrated in FIG. 4. The "curved shape" is a generic term for a shape in which part of the outline is formed by a curve, a shape whose outline is formed only by a curve, and the like. The "any other shape" includes, for example, a shape in which two or more arbitrary shapes such as a rectangle, a polygon, and a curved shape, are combined. Herein, the sectional shape of the cleavage groove 34M is, for example, a rectangle (box shape) extending in a depth direction.

Third, a range of forming the cleavage groove 34M is not particularly limited. Thus, the range of forming the cleavage groove 34M may be only a portion of or the entirety of the peripheral region of the coupling portion 34C. When the cleavage groove 34M is provided only in a portion of the peripheral region of the coupling portion 34C, as described later, the plurality of cleavage grooves 34M may be provided in the peripheral region (see FIG. 15).

Herein, since the cleavage groove 34M is provided, for example, in the entire peripheral region of the coupling portion 34C, the cleavage groove 34M surrounds the coupling portion 34C. That is, the cleavage groove 34M has, for example, an annular shape surrounding the coupling portion 34C. This is because, since the central portion 34Y is removed by cleavage of the sub-disc 34 along the cleavage groove 34M, the sub-disc 34 can easily and stably open. The term "annular shape" denotes a so-called ring shape, and a shape formed by the cleavage groove 34M is not necessarily a circle. Thus, the shape formed by the annular cleavage groove 34M can be determined arbitrarily.

Fourth, a shape formed by the cleavage groove 34M is not particularly limited. Thus, the shape formed by the cleavage groove 34M may be a circle, a polygon, or any other shape. The circle includes, for example, an elliptical shape and all shapes having no corners due to the outline being formed only by a curve. The polygon is, for example, a triangle, a square, a pentagon, or a hexagon. The term "any other shape" includes, for example, a shape in which any two or more of a circle, a polygon and the like are combined. Herein, since the shape formed by the cleavage groove 34M is, for example, a circle, the cleavage groove 34M is, for example, a so-called ring shape.

Fifth, the range of forming the cleavage groove 34M is not particularly limited. Herein, for example, the cleavage groove 34M is provided inside a region corresponding to the opening 33C provided in the stripper disc 33. As will be described later, this is because, when the sub-disc 34 opens in response to the increase in the internal pressure of the battery can 11 during operation of the safety valve mechanism 30, a portion (central portion 34Y) of the sub-disc 34 can be easily lifted in the state of being coupled to the protrusion 31T. Consequently, the safety cover 31 and the sub-disc 34 can be easily separated physically, and as a result, electrical decoupling between the battery lid 14 functioning as a positive electrode terminal and the wound electrode body 20 can be easily provided.

In FIG. 5, the outline of the opening 33C is shown by a broken line in order that the region corresponding to the opening 33C provided in the stripper disc 33 is easily understood. That is, the region corresponding to the opening 33C is a region surrounded by the broken line.

Details concerning dimensions of the sub-disc 34 are as follows.

First, a thickness T1, which is a first thickness of the sub-disc 34 at a portion where the cleavage groove 34M is not provided, is not particularly limited; however, the thickness T1 is preferably 0.05 mm to 0.30 mm. This is because in order to couple the protrusion 31T of the safety cover 31 to the sub-disc 34 by using a welding method or the like, the thickness of the sub-disc 34 is to be 0.05 mm or more. In addition, an operating pressure of the safety valve mechanism 30 described later is optimized, and operation stability of the safety valve mechanism 30 is thus further improved.

Second, a thickness T2, which is a second thickness of the sub-disc 34 at a portion where the cleavage groove 34M is provided, is not particularly limited; however, the thickness T2 is preferably 0.02 mm to 0.07 mm. The operating pressure of the safety valve mechanism 30 is optimized, and the operation stability of the safety valve mechanism 30 is thus further improved. With respect to the thicknesses T1 and T2 and the depth S, a relationship of T2=T1−S is established.

Third, a ratio T2/T1 of the thickness T2 to the thickness T1 is not particularly limited; however, the ratio T2/T1 is preferably 0.2 to 0.7. The operating pressure of the safety valve mechanism 30 is optimized, and the operation stability of the safety valve mechanism 30 is thus further improved.

Fourth, when the cleavage groove 34M has a ring shape, an inner diameter D of the cleavage groove 34M is not particularly limited; however, the inner diameter D is preferably 0.6 mm to 1.8 mm. The operating pressure of the safety valve mechanism 30 is optimized, and the operation stability of the safety valve mechanism 30 is thus further improved. The inner diameter D is, in other words, an outer diameter of the central portion 34Y.

Fifth, the width W of the cleavage groove 34M is not particularly limited, and is, for example, 0.10 mm to 0.30 mm. This is because the sub-disc 34 can easily cleaves as a result of the cleavage groove 34M in response to the increase in the internal pressure of the battery can 11.

It is preferable that operating conditions of the safety valve mechanism 30 using the sub-disc 34 described above be optimized.

Here, attention is to be paid to the above-described operating pressure (current interruption operating pressure: $kgf/cm^2$) as the operating condition of the safety valve mechanism 30. The "current interruption operating pressure" is a pressure (the internal pressure of the battery can 11) at which electrical decoupling between the battery lid 14 and the wound electrode body 20 is provided by physical separation between the safety cover 31 and the sub-disc 34. The current interruption operating pressure is preferably 8 kgf/cm$^2$ to 28 kgf/cm$^2$. This is because the safety valve mechanism 30 can easily operate appropriately when, for example, the secondary battery is stored at a high temperature or the secondary battery is overcharged, and the operation stability of the safety valve mechanism 30 is thus ensured.

Here, when a relationship between the dimensions (thicknesses T1 and T2 and inner diameter D) of the sub-disc 34 and the operating pressure of the safety valve mechanism 30 is examined, a multiple correlation equation represented by the following equation (1) is derived. Thus, an operating pressure P of the safety valve mechanism 30 calculated using the multiple correlation equation shown in equation (1), that is, the current interruption operating pressure is preferably 8 kgf/cm$^2$ to 28 kgf/cm$^2$, as described above. In other words, it is preferable to set the thickness T1 and T2 and the inner diameter D such that the current interruption operating pressure be within a suitable range (8 kgf/cm$^2$ to 28 kgf/cm$^2$).

$$P = 40 \times T1 + 6.7 \times D + 400 \times T2 - 12 \quad (1)$$

(P is the operating pressure (kgf/cm$^2$) of the safety valve mechanism 30. T1 is the thickness (mm) of the sub-disc 34 at the portion where the cleavage groove 34M is not provided. D is the inner diameter (mm) of the ring-shaped cleavage groove 34M. T2 is the thickness (mm) of the sub-disc 34 at the portion where the cleavage groove 34M is provided.)

Next, a configuration of the wound electrode body 20 will be described.

Figure 6:
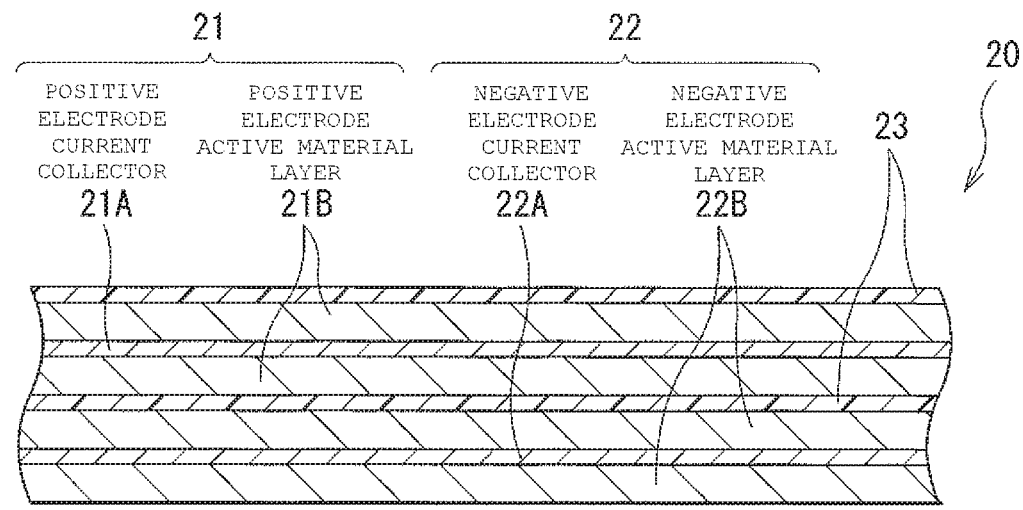
FIG. 6 is a partially enlarged sectional view of a configuration of a wound electrode body illustrated in FIG. 1.

FIG. 6 illustrates an enlarged portion of a sectional configuration of the wound electrode body 20 illustrated in FIG. 1. As described above, the wound electrode body 20 includes the positive electrode 21, the negative electrode 22, the separator 23, and the electrolytic solution.

As illustrated in FIG. 6, the positive electrode 21 includes, for example, a positive electrode current collector 21A and a positive electrode active material layer 21B provided on each surface of the positive electrode current collector 21A. However, the positive electrode active material layer 21B may be provided on only one surface of the positive electrode current collector 21A.

The positive electrode current collector 21A contains, for example, one or two or more conductive materials. The kind of conductive material is not particularly limited; however, examples of the conductive material include metal materials such as aluminum, nickel, and stainless steel. The positive electrode current collector 21A may be formed of a single layer, or may be formed of multiple layers.

The positive electrode active material layer 21B includes one or two or more positive electrode materials capable of absorbing and releasing lithium as a positive electrode active material. The positive electrode active material layer 21B may further contain one or two or more other materials such as a positive electrode binder and a positive electrode conductive agent.

The positive electrode material is preferably a lithium-containing compound. The kind of lithium-containing compound is not particularly limited and is, for example, a lithium-containing composite oxide or a lithium-containing phosphate compound. This is because a high energy density can be obtained.

The lithium-containing composite oxide is a generic term for oxides containing lithium and one or two or more other elements (elements is other than lithium) as constituent elements, and has, for example, one of crystal structures such as a layered rock-salt crystal structure and a spinel crystal structure. The lithium-containing phosphate compound is a generic term for phosphate compounds that contain lithium and one or two or more other elements as constituent elements and has, for example, a crystal structure such as an olivine crystal structure.

The kind of one or two or more other elements is not particularly limited as long as the other elements are one or two or more arbitrary elements. In particular, the other elements are preferably one or two or more elements belonging to Groups 2 to 15 in the long-periodic table. More specific examples of other elements are nickel (Ni), cobalt (Co), manganese (Mn), and iron (Fe). This is because a high voltage can be obtained.

Examples of the lithium-containing composite oxide having the layered rock-salt crystal structure include compounds represented by the following formulas (1) to (3), respectively.

$$Li_a Mn_{(1-b-c)} Ni_b M11_c O_{(2-d)} F_e \quad (1)$$

(where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e = 0.1$, it is to be noted that the composition of lithium varies depending on charge and discharge states, and "a" is a value in a completely discharged state.)

$$Li_a Ni_{(1-b)} M12_b O_{(2-c)} F_d \quad (2)$$

(where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0.005 \leq b \leq 0.5$, $-0.1 \leq c \leq 0.2$, and $0 \leq d \leq 0.1$, it is to be noted that the composition of lithium varies depending on charge and discharge states, and "a" is a value in a completely discharged state.)

$$Li_a Co_{(1-b)} M13_b O_{(2-c)} F_d \quad (3)$$

(where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0 \leq b < 0.5$, $-0.1 \leq c \leq 0.2$, and $0 \leq d \leq 0.1$, it is to be noted that the composition of lithium varies depending on charge and discharge states, and "a" is a value in a completely discharged state.)

Specific examples of the lithium-containing composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

In the case where the lithium-containing composite oxide having the layered rock-salt crystal structure contains, as constituent elements, nickel, cobalt, manganese, and aluminum, an atomic ratio of nickel preferably not less than 50 at %. This is because a high energy density can be obtained.

Examples of the lithium-containing composite oxide having the spinel crystal structure include compounds represented by the following formula (4).

$$Li_aMn_{(2-b)}M14_bO_cF_d \quad (4)$$

M14 is one or more of cobalt (Co), nickel (Ni), magnesia aluminum boron titanium (Ti), vanadium (V) chromium (Cr), iron (Fe), copper (Cu), zinc (Zn), molybdenum (Mo), tin (Sr), calcium (Ca), strontium (Sr), and tungsten (W), "a" to "d" satisfy $0.9 \leq a \leq 1.1$, $0 \leq b \leq 0.6$, $3.7 \leq c \leq 4.1$, and $0 \leq d \leq 0.1$, it is to be noted that the composition of lithium varies depending on charge and discharge states, and "a" is a value in a completely discharged state.)

Specific examples of the lithium-containing composite oxide having the spinel crystal structure include $LiMn_nO_4$.

Examples of the lithium-containing phosphate compound having the olivine crystal structure include compounds represented by the following formula (5).

$$Li_aM15PO_4 \quad (5)$$

(where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \leq a \leq 1.1$, it is to be noted that the composition of lithium varies depending on charge and discharge states, and "a" is a value in a completely discharged state.)

Specific examples of the lithium-containing phosphate compound having the olivine crystal structure include $LiFePO_4$, $LiMnPO_4$, $LiFe_{0.5}Mn_{0.5}PO_4$, and $LiFe_{0.3}Mn_{0.7}PO_4$.

The lithium-containing composite oxide may be, for example, a compound represented by the following formula (6).

$$(Li_2MnO_3)_x(LiMnO_2)_{1-x} \quad (6)$$

(where x satisfies $0 \leq x \leq 1$, it is to be noted that the composition of lithium varies depending on charge and discharge states, and "x" is a value in a completely discharged state.)

In addition, the positive electrode material may be, for example, one or two or more of an oxide, a disulfide, a chalcogenide, a conductive polymer, and the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene. However, the positive electrode material may be a material other than the materials described above.

The positive electrode binder contains, for example, one or two or more of synthetic rubber, polymer compounds, and the like. Examples of the synthetic rubber include styrene-butadiene-based rubber, fluororubber, and ethylene propylene diene. Examples of the polymer compounds include polyvinylidene fluoride and polyimide.

The positive electrode conductive agent contains, for example, one or two or more carbon materials and the like. Examples of the carbon materials include graphite, carbon black, acetylene black, and Ketjen black. The positive electrode conductive agent may be a metal material, a conductive polymer, or the like as long as the positive electrode conductive agent has electric conductivity.

As illustrated in FIG. 6, the negative electrode 22 includes, for example, a negative electrode current collector 22A and a negative electrode active material layer 22B provided on each surface of the negative electrode current collector 22A. However, the negative electrode active material layer 22B may be provided on only one surface of the negative electrode current collector 22A.

The negative electrode current collector 22A contains, for example, one or more conductive materials. The kind of conductive material is not particularly limited; and examples of the conductive material include metal materials such as copper, aluminum, nickel, and stainless steel. The negative electrode current collector 22A may be formed of a single layer, or may be formed of multiple layers.

A surface of the negative electrode current collector 22A may be preferably roughened. This makes it possible to improve adhesiveness of the negative electrode active material layer 22B with respect to the negative electrode current collector 22A by using a so-called anchor effect. In this case, it is sufficient that the surface of the negative electrode current collector 22A at least in a region facing the negative electrode active material layer 22B be roughened. Examples of the roughening method include a method of forming fine particles by utilizing electrolytic treatment. Through the electrolytic treatment, fine particles are formed on the surface of the negative electrode current collector 22A in an electrolytic bath by an electrolytic method to thereby make the surface of the negative electrode current collector 22A rough. A copper foil fabricated by an electrolytic method is generally called "electrolytic copper foil".

The negative electrode active material layer 22B contains one or two or more negative electrode materials capable of absorbing and releasing lithium as a negative electrode active material. The negative electrode active material layer 22B may further contain one or two or more materials such as a negative electrode binder and a negative electrode conductive agent.

The chargeable capacity of the negative electrode material s preferably larger than the discharge capacity of the positive electrode 21 for the purpose of suppressing unintentional precipitation of lithium metal on the surface of the negative electrode 22 during charging. That is, the electrochemical equivalent of the negative electrode material capable of absorbing and releasing lithium is preferably larger than the electrochemical equivalent of the positive electrode 21.

The negative electrode material is, for example, a carbon material. The carbon material causes an extremely small change in the crystal structure thereof when lithium is absorbed or released, which stably achieves a high energy density. Further, the carbon material also serves as the negative electrode conductive agent, which improves conductivity of the negative electrode active material layer 22B.

Examples of the carbon material include graphitizable carbon, non-graphitizable carbon, and graphite. It is to be noted that spacing of the (002) plane in the non-graphitizable carbon is preferably not less than 0.37 nm, and that spacing of the (002) plane in the graphite is preferably not more than 0.34 nm. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a material obtained by firing (carbonizing) a polymer compound such as phenol resin and furan resin at an appropriate temperature. Other than the materials mentioned above, the carbon material may be low crystalline carbon subjected to a heat treatment at a temperature of about 1000° C. or lower or may be amorphous carbon. The form of the carbon material may be any of a fibrous form, a spherical form, a granular form, and a scale-like form.

The negative electrode material is, for example, a metal-based material. The "metal-based material" is a generic term for a material containing one or two or more metal elements and metalloid elements as constituent elements. This is because a high energy density can be obtained.

The metal-based material may be a simple substance of metal, an alloy, or a compound, may be two or more thereof, or may include one or two or more phases thereof in part or all thereof. It is to be noted that the alloy also encompasses a material that contains one or more metal elements and one or more metalloid elements, in addition to a material formed of two or more metal elements. Further, the alloy may contain a non-metallic element. Examples of the structure of the metal-based material include a solid solution, a eutectic crystal (a eutectic mixture), an intermetallic compound, and a structure in which two or more thereof coexist.

The metal elements and the metalloid elements described above are, for example, one or two or more metal elements and metalloid elements that are able to form an alloy with lithium. Specific examples of the metal elements and the metalloid elements include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon and tin are preferred. This is because silicon and tin are good at absorbing and releasing lithium, and therefore realize a significantly high energy density.

A material containing silicon as a constituent element may be a simple substance of silicon, a silicon alloy, or a silicon compound, may be two or more thereof, or may include one or two or more phases thereof in part or all thereof.

A material containing tin as a constituent element may be a simple substance of tin, a tin alloy, or a tin compound, may be two or more thereof, or may include one or two or more phases thereof in part or all thereof.

Since the "simple substance" described here denotes only a simple substance in general terms, the simple substance may include a minor amount of impurities. That is, the purity of a simple substance is not necessarily limited to 100%.

The silicon alloy contains, for example, one or two or more elements such as tin, nickel, copper, iron, cobalt, manganese, zinc, indium, silver, titanium, germanium, bismuth, antimony, and chromium, as constituent elements other than silicon. The silicon compound contains, for example, one or two or more elements such as carbon and oxygen as constituent elements other than silicon. The silicon compound contains, for example, one or two or more of the elements described in relation to the silicon alloy, as constituent elements other than silicon.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), and LiSiO. v in $SiO_v$ may be $0.2<v<1.4$.

The tin alloy contains, for example, one or two or more elements such as silicon, nickel, copper, iron, cobalt, manganese, zinc, indium, silver, titanium, germanium, bismuth, antimony, and chromium, as constituent elements other than tin. The tin compound contains, for example, one or two or more elements such as carbon and oxygen as constituent elements other than tin. The tin compound contains, for example, one or two or more of the elements described in relation to the tin alloy, as constituent elements other than tin.

Specific examples of the tin alloy and the tin compound include $SnO_w$ ($0<w\leq 2$), $SnSiO_3$, LiSnO, and $Mg_2Sn$.

In particular, the material containing tin as a constituent element is preferably, for example, a material (tin-containing material) that contains, together with tin as a first constituent element, a second constituent element, and a third constituent element. Examples of the second constituent element are one or two or more elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. Examples of the third constituent element are one or two or more elements such as boron, carbon, aluminum, and phosphorus. This is because high battery capacity, good cycle characteristics, and the like can be obtained.

In particular, the tin-containing material is preferably a material (a tin-cobalt-carbon-containing material) that contains tin, cobalt, and carbon as constituent elements. In the tin-cobalt-carbon-containing material, for example, the carbon content is 9.9% by mass to 29.7% by mass, and the content ratio of tin and cobalt (Co/(Sn+Co)) is 20% by mass to 70% by mass. This is because a high energy density can be obtained.

The tin-cobalt-carbon-containing material has a phase that contains tin, cobalt, and carbon as constituent elements, and the phase is preferably low crystalline or amorphous. The phase is a reaction phase capable of reacting with lithium, and therefore good characteristics can be obtained as a result of existence of the reaction phase. A half-width (a diffraction angle $2\theta$) of a diffraction peak obtained by X-ray diffraction of this reaction phase may be preferably 1° or larger in the case where a CuKα ray is used as a specific X-ray, and a scanning speed is 1°/min. This makes it possible to absorb and release lithium smoothly and to decrease reactivity with the electrolytic solution. In some cases, the tin-cobalt-carbon-containing material may have a phase that contains elements of the respective constituent elements or part thereof in addition to the low-crystalline phase or the amorphous phase.

In order to easily determine whether the diffraction peak obtained by the X-ray diffraction is a diffraction peak corresponding to the reaction phase that is able to react with lithium, X-ray diffraction charts before and after an electrochemical reaction with lithium may be compared with each other. For example, if the position of the diffraction peak after the electrochemical reaction with lithium is changed from the position of the diffraction peak before the electrochemical reaction with lithium, the obtained diffraction peak is a diffraction peak corresponding to the reaction phase that is able to react with lithium. In this case, for example, the diffraction peak of the reaction phase as the low-crystalline reaction phase or the amorphous reaction phase is detected in a range of $2\theta=20°$ to 50°. The reaction phase includes, for example, the respective constituent elements described above, and it is considered that the reaction phase has become low crystalline or amorphous mainly because of the existence of carbon.

In the tin-cobalt-carbon-containing material, part or all of the carbon that is the constituent element thereof is preferably bound to a metal element or a metalloid element that is another constituent element thereof. This is because cohesion, crystallization, and the like of tin are suppressed. It is possible to check a binding state of the elements, for example, by an X-ray photoelectron spectroscopy (XPS) method. In a commercially available device, for example, an Al-Kα ray or a Mg-Kα ray is used as a soft X-ray. In the case where part or all of the carbon is bound to a metal element, a metalloid element, or the like, the peak of a synthetic wave of the 1 s orbit of carbon (C1s) is detected in a region lower than 284.5 eV. It is assumed that energy calibration is made so that the peak of the 4f orbit of a gold atom (Au4f) is obtained at 84.0 eV. In this case, in general, since surface contamination carbon exists on the material surface, a position where the peak of C1s of the surface contamination carbon is detected is regarded as 284.8 eV, and this peak is used as an energy reference. In XPS measurement, the waveform of the peak of C1s is obtained as a state including the peak of the surface contamination carbon and the peak of carbon in the SnCoC-containing material. Thus, for example, the peak is analyzed using commercially available software to separate the peak of the surface contamination carbon and the peak of the carbon in the SnCoC-containing material from each other. In the analysis of the waveform, the position of the main peak existing on the lowest bound energy side is set to the energy reference (284.8 eV).

The tin-cobalt-carbon-containing material is not limited to the material (SnCoC) that contains only tin, cobalt, and carbon as constituent elements. The tin-cobalt-carbon-containing material may further contain, for example, one or two or more elements such as silicon, iron, nickel, chromium, indium, niobium, germanium, titanium, molybdenum, aluminum, phosphorus, gallium, and bismuth as constituent elements in addition to tin, cobalt, and carbon.

Besides tin-cobalt-carbon-containing materials, materials containing tin, cobalt, iron, and carbon as constituent elements (tin-cobalt-iron-carbon-containing materials) are also preferable. Any composition of the tin-cobalt-iron-carbon-containing material may be adopted. For example, in the case where the iron content is set smaller, the carbon content is 9.9% by mass to 29.7% by mass, the iron content is 0.3% by mass to 5.9% by mass, and the content ratio of tin and cobalt (Co/(Sn+Co)) is 30% by mass to 70% by mass. Alternatively, in the case where the iron content is set larger, the carbon content is 11.9% by mass to 29.7% by mass, the content ratio of tin, cobalt, and iron ((Co+Fe)/(Sn+Co+Fe)) is 26.4% by mass to 48.5% by mass, and the content ratio of cobalt and iron (Co/(Co+Fe)) is 99% by mass to 79.5% by mass. This is because a high energy density can be obtained. Physical characteristics (such as a half-width) of the tin-cobalt-iron-carbon-containing material are similar to physical characteristics of the foregoing tin-cobalt-carbon-containing material, for example.

Other than the materials mentioned above, the negative electrode material may be, for example, one or two or more of a metal oxide, a polymer compound, and the like. Examples of the metal oxide include iron oxide, ruthenium oxide, and molybdenum oxide. Examples of the polymer compound include polyacetylene, polyaniline, and polypyrrole.

In particular, the negative electrode material preferably contains both the carbon material and the metal-based material for the following reasons.

There is a concern that the metal-based material, in particular, the material containing one or both of silicon and tin as constituent elements is easily and intensely expanded or contracted at the time of charge and discharge, whereas such a material has an advantage of high theoretical capacity. In contrast, the carbon material has an advantage that the carbon material is less prone to expansion or contraction at the time of charge and discharge, whereas there is a concern that the carbon material has a low theoretical capacity. Accordingly, using both the carbon material and the metal-based material makes it possible to suppress expansion and contraction of the negative electrode material during charging and discharging while achieving a high theoretical capacity (in other words, high battery capacity).

The negative electrode active material layer 22B is formed by using, for example, one or two or more of a coating method, a gas phase method, a liquid phase method, a thermal spraying method, and a firing method (sintering method). The coating method is a method in which, for example, after a particulate (powder) negative electrode active material is mixed with a negative electrode binder and the like, the mixture is dissolved or dispersed in an organic solvent or the like, and the negative electrode current collector 22A is then coated with the resultant. Examples of the gas phase method include a physical deposition method and a chemical deposition method. More specifically, examples thereof include a vacuum evaporation method, a sputtering method, an ion plating method, a laser ablation method, a thermal chemical a vapor deposition method, a chemical vapor deposition (CVD) method, and a plasma chemical vapor deposition method. Examples of the liquid phase method include an electrolytic plating method and an electroless plating method. The thermal spraying method is a method in which a negative electrode active material in a fused state or a semi-fused state is sprayed onto the negative electrode current collector 22A. The firing method is, for example, a method in which after the negative electrode current collector 22A is coated with the mixture dissolved or dispersed in the organic solvent or the like by the coating method, the mixture is subjected to heat treatment at a temperature higher than the melting point of the negative electrode binder or the like. Examples of the firing method include an atmosphere firing method, a reactive firing method, and a hot press firing method.

In the secondary battery, as described above, the electrochemical equivalent of the negative electrode material capable of absorbing and releasing lithium is preferably larger than the electrochemical equivalent of the positive electrode for the purpose of preventing lithium metal from being unintentionally precipitated on the surface of the negative electrode 22 during charging. Further, in the case where an open circuit voltage (that is, a battery voltage) in a completely charged state is 4.25 V or higher, a release amount of lithium per unit mass is larger than that in the case where the open circuit voltage in the completely charged state is 4.20 V, even if the same positive electrode active material is used, and therefore, in consideration of this, it is preferable that amounts of the positive electrode active material and the negative electrode active material be adjusted. Accordingly, a high energy density is obtained.

For example, the separator 23 is interposed between the positive electrode 21 and the negative electrode 22 as illustrated in FIG. 6. Accordingly, the separator 23 separates the positive electrode 21 from the negative electrode 22 and passes lithium ions therethrough while preventing a current short circuit resulting from contact between the positive electrode 21 and the negative electrode 22.

The separator 23 includes, for example, one or two or more porous films made of synthetic resin, ceramics, or the like. The separator 23 may be a laminated film in which two or more porous films are stacked. Examples of the synthetic resin include polytetrafluoroethylene, polypropylene, and polyethylene.

In particular, the separator 23 may include, for example, the foregoing porous film (substrate layer) and a polymer compound layer provided on a one surface or both surfaces of the substrate layer. This is because improvement in adhesion of the separator 23 with respect to each of the positive electrode 21 and the negative electrode 22 enables distortion of the wound electrode body 20 to be suppressed. This makes it possible to suppress a decomposition reaction of the electrolytic solution and to suppress liquid leakage of the electrolytic solution with which the substrate layer is impregnated. Accordingly, resistance is less prone to increasing, even if charge and discharge are repeated, and battery swelling is suppressed.

The polymer compound layer includes, for example, one or two or more polymer compounds such as polyvinylidene fluoride. This is because polyvinylidene fluoride has sufficient physical strength and is electrochemically stable. When the polymer compound layer is formed, for example, the substrate layer is coated with a solution prepared by dissolving the polymer compound in, for example, an organic solvent, and thereafter, the substrate layer is dried. Alternatively, for example, the substrate layer may be immersed in the solution, and thereafter the substrate layer may be dried. The polymer compound layer may contain, for example, one or two or more types of insulating particles such as inorganic particles. The types of inorganic particles are, for example, aluminum oxide and aluminum nitride.

The separator 23 is impregnated with an electrolytic solution as described above. For example, as described above, the positive electrode 21 may be impregnated with the electrolytic solution or the negative electrode 22 may be impregnated with the electrolytic solution.

The electrolytic solution contains a solvent and an electrolytic salt. The electrolytic solution may further contain one or two or more other materials such as additives.

The solvent contains one or two or more nonaqueous solvents such as organic solvents. The electrolytic solution containing the nonaqueous solvent is a so-called nonaqueous electrolytic solution.

Examples of the nonaqueous solvent include a cyclic carbonate ester, a chain carbonate ester, a lactone, a chain carboxylic ester, and a nitrile (mononitrile). The nonaqueous solvents make it possible to achieve, for example, high battery capacity, good cycle characteristics, and good storage characteristics.

Examples of the cyclic carbonate ester include ethylene carbonate, propylene carbonate, and butylene carbonate. Examples of the chain carbonate ester include dimethyl carbonate, diethyl carbonate, ethyl methyl carbonate, and methyl propyl carbonate. Examples of the lactone include γ-butyrolactone and γ-valerolactone. Examples of the chain carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

Other than the materials mentioned above, examples of the nonaqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. These nonaqueous solvents make it possible to achieve similar advantages.

In particular, the nonaqueous solvent preferably contains one or two or more of ethylene carbonate, propylene carbonate, dimethyl carbonate, diethyl carbonate, ethyl methyl carbonate, and the like. The nonaqueous solvents make it possible to achieve, for example, high battery capacity, good cycle characteristics, and good storage characteristics. In this case, a combination of a high-viscosity (high dielectric constant) solvent (having, for example, relative permittivity $\varepsilon \geq 30$) such as ethylene carbonate and propylene carbonate and a low-viscosity solvent (having, for example, viscosity $\leq 1$ mPa·s) such as dimethyl carbonate, ethylmethyl carbonate, and diethyl carbonate is more preferable. The combination makes it possible to improve the dissociation property of the electrolytic salt and ion mobility.

For example, the nonaqueous solvent may be an unsaturated cyclic carbonate ester, a halogenated carbonate ester, a sulfonate ester, an acid anhydride, a dicyano compound (dinitrile compound), a diisocyanate compound, a phosphoric ester, a chain compound having a carbon-carbon triple bond, or the like. This makes it possible to improve the chemical stability of the electrolytic solution.

The "unsaturated cyclic carbonate ester" is a cyclic carbonate ester having one or two or more unsaturated bonds (carbon-carbon double bonds or carbon-carbon triple bonds). Examples of the unsaturated cyclic carbonate ester include vinylene carbonate, vinyl ethylene carbonate, and methylene ethylene carbonate. The content of the unsaturated cyclic carbonate ester in the nonaqueous solvent is not particularly limited; however, the content is, for example, 0.01% by weight to 10% by weight.

The "halogenated carbonate ester" is a cyclic carbonate ester having one or two or more halogen elements as constituent elements or a chain carbonate ester having one or two or more halogen elements as constituent elements. When the halogenated carbonate ester contains two or more halogens as constituent elements, the number of types of these two or more halogens may be one or two or more. Examples of the cyclic halogenated carbonate ester include 4-fluoro-1,3-dioxolan-2-one and 4,5-difluoro-1,3-dioxolan-2-one. Examples of the chain halogenated carbonate ester include fluoromethyl methyl carbonate, bis(fluoromethyl) carbonate, and difluoromethyl methyl carbonate. The content of the halogenated carbonate ester in the nonaqueous solvent is not particularly limited; however, the content is, for example, 0.01% by weight to 50% by weight.

Examples of the sulfonate ester include a monosulfonate ester and a disulfonate ester, The content of the sulfonate ester in the nonaqueous solvent is not particularly limited; however, the content is, for example, 0.01% by weight to 10% by weight.

The monosulfonate ester may be a cyclic monosulfonate ester or a chain monosulfonate ester. Examples of the cyclic monosulfonate ester include sultones such as 1,3-propane sultone and 1,3-propene sultone. Examples of the chain monosulfonate ester include a compound in which a cyclic monosulfonate ester is cleaved at a middle site. The disulfonate ester may be a cyclic disulfonate ester or a chain disulfonate ester.

Examples of the acid anhydride include carboxylic anhydride, disulfonic anhydride, and carboxylic-sulfonic anhydride. Examples of the carboxylic anhydride include succinic anhydride, glutaric anhydride, and maleic anhydride. Examples of the disulfonic anhydride include ethanedisulfonic anhydride and propanedisulfonic anhydride. Examples of the carboxylic-sulfonic anhydride include sulfobenzoic anhydride, sulfopropionic anhydride, and sulfobutyric anhydride. The content of the acid anhydride in the nonaqueous solvent is not particularly limited; however, the content is, for example, 0.5% by weight to 5% by weight.

Examples of the dinitrile compound include a compound represented by NC—R1-CN (R1 is an alkylene group or an arylene group). Examples of the dinitrile compound include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN). The content of the dinitrile compound in the nonaqueous solvent is not particularly limited; however, the content is, for example, 0.5% by weight to 5% by weight.

Examples of the diisocyanate compound include a compound represented by OCN—R2-NCO (R2 is an alkylene group or an arylene group). Examples of the diisocyanate compound include hexamethylene diisocyanate (OCN—$C_6H_{12}$—NCO). The content of the diisocyanate compound in the nonaqueous solvent is not particularly limited; however, the content is, for example, 0.5% by weight to 5% by weight.

Examples of the phosphoric ester include trimethyl phosphate and triethyl phosphate. The content of the phosphoric ester in the nonaqueous solvent is not particularly limited; however, the content is, for example, 0.5% by weight to 5% by weight.

The chain compound having a carbon-carbon triple bond is a chain compound having one or more carbon-carbon triple bonds (—C≡C—). Examples of the chain compound having a carbon-carbon triple bond include propargyl methyl carbonate (CH≡C—$CH_2$—O—C(=O)—O—$CH_3$) and propargyl methyl sulfonate (CH≡C—$CH_2$—O—S(=O)$_2$—$CH_3$). The content of the chain compound having the carbon-carbon triple bond in the nonaqueous solvent is not particularly limited; however, the content is, for example, 0.5% by weight to 5% by weight.

The electrolytic salt contains, for example, one or two or more salts such as lithium salts. The electrolytic salt may contain a salt other than the lithium salt. Examples of the salt other than the lithium include a light metal salt other than lithium.

Examples of the lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). This is because high battery capacity, good cycle characteristics, and good storage characteristics can be obtained.

In particular, one or two or more of lithium hexafluorophosphate, lithium tetrafluoroborate, lithium perchlorate, and lithium hexafluoroarsenate are preferable, and lithium hexafluorophosphate is more preferable. This is because internal resistance decreases.

The content of the electrolytic salt is not particularly limited; however, the content is preferably 0.3 mol/kg to 3.0 mol/kg with respect to the solvent. High ion conductivity is achievable in this range.

Next, operation of the secondary battery will be described.

Figure 7:
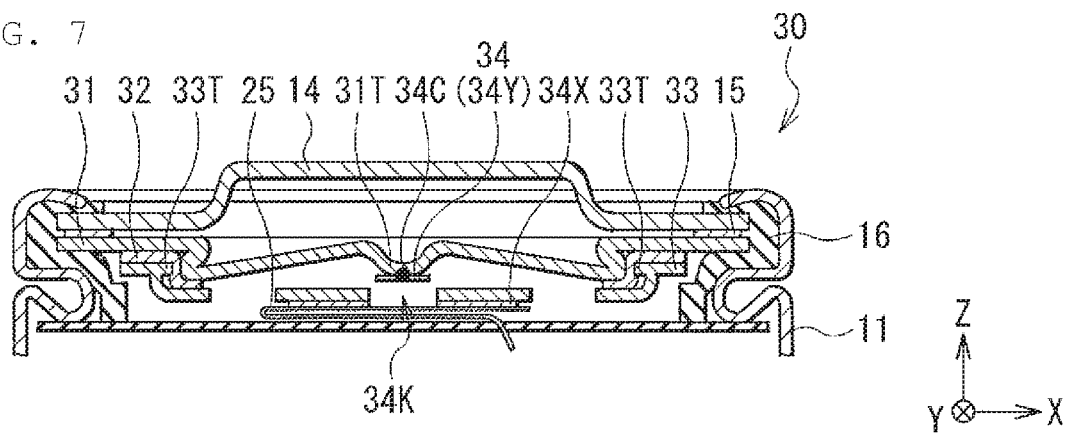
FIG. 7 is a sectional view for explaining operation of A secondary battery (safety valve mechanism) according to an embodiment of the present technology.
Figure 8:
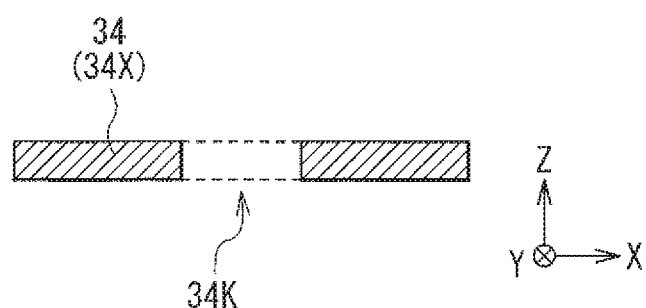
FIG. 8 is a sectional view of a configuration of a sub-disc during operation of the safety valve mechanism according to an embodiment of the present technology.
Figure 9:
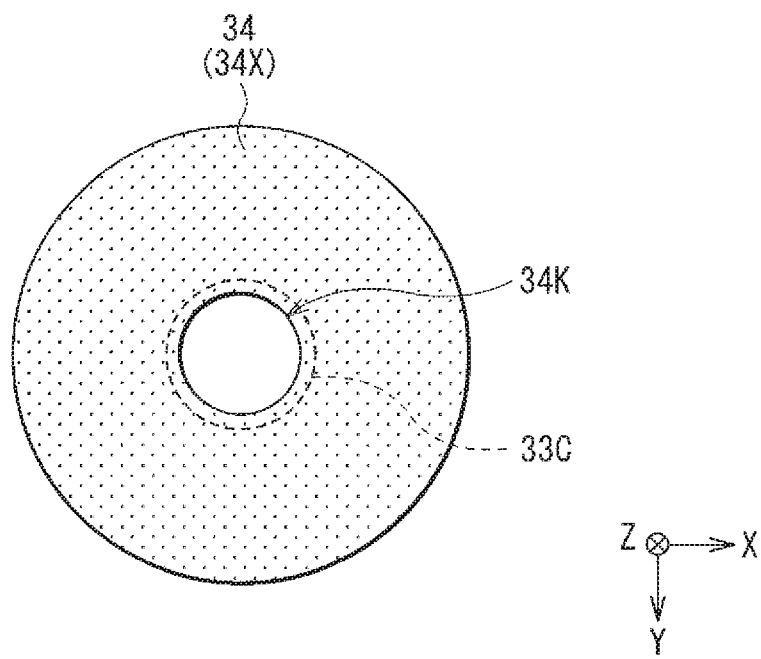
FIG. 9 is a plan view of the configuration of the sub-disc during operation of the safety valve mechanism according to an embodiment of the present technology.
Figure 10:
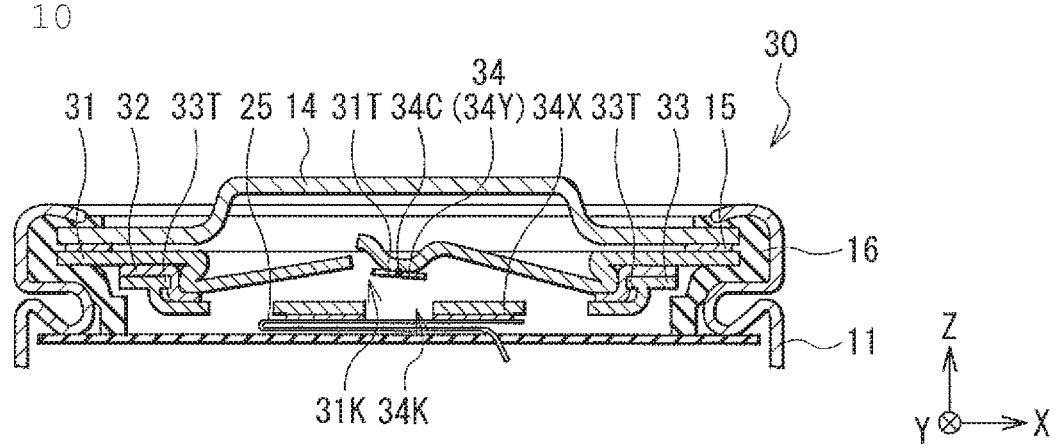
FIG. 10 is a sectional view for explaining the operation of the secondary battery (safety valve mechanism) following FIG. 7.

Each of FIGS. 7 to 10 illustrates a configuration of the secondary battery during operation in order to describe the operation of the secondary battery. Each of FIGS. 7 and 10 illustrates a sectional configuration corresponding to FIG. 2. FIG. 8 illustrates a sectional configuration corresponding to FIG. 4. FIG. 9 illustrates a plan configuration corresponding to FIG. 5.

Hereinafter, after describing charge/discharge operation of the secondary battery, safe operation of the secondary battery (safety valve mechanism 30) will be described.

When the secondary battery is charged, for example, lithium ions are released from the positive electrode 21, and the lithium ions are absorbed into the negative electrode 22 through the electrolytic solution. On the other hand, when the secondary battery is discharged, for example, lithium ions are released from the negative electrode 22, and the lithium ions are absorbed into the positive electrode 21 through the electrolytic solution.

When the internal pressure of the battery can 11 increases during, for example, use and storage of a secondary battery, the safety valve mechanism 30 operates in order to prevent, for example, rupture and breakage of the secondary battery.

Specifically, during a normal period, which is when the internal pressure of the battery can 11 is low, as illustrated in FIGS. 2 to 5, the safety cover 31 (opening valve portion 31R) has not yet opened, and the opening valve portion 31R obstructs a gas release path that utilizes the plurality of openings 33K.

On the other hand, when gas is generated due to a side reaction such as a decomposition reaction of the electrolytic solution inside the battery can 11, the gas accumulates in the battery can 11, and the internal pressure of the battery can 11 thus increases.

In this case, when the internal pressure of the battery can 11 has reached a certain level or higher, for example, as illustrated in FIGS. 7 to 9, the sub-disc 34 cleaves as a result of the cleavage groove 34M, whereby the central portion 34Y is separated from the outer peripheral portion 34X. That is, since an opening 34K is formed in the sub-disc 34, the sub-disc 34 opens. However, if the sub-disc 34 opens, the central portion 34Y may be partially coupled to the outer peripheral portion 34X without being separated from the outer peripheral portion 34X. Consequently, since the safety cover 31 is partially lifted while the protrusion 31T is coupled to the central portion 34Y by utilizing the internal pressure of the battery can 11, the safety cover 31 and the sub-disc 34 (outer peripheral portion 34X) are physically separated. Thus, electrical decoupling is provided between the battery lid 14 and the wound electrode body 20 to interrupt a path of a current flowing from the wound electrode body 20 to the battery lid 14.

Next, when the internal pressure of the battery can 11 further increases, as illustrated in FIG. 10, the safety cover 31 (opening valve portion 31R) cleaves. Consequently, because the opening 31K is formed in the safety cover 31, the safety cover 31 opens. Thus, since the gas release path utilizing the plurality of openings 33K opens, gas is released through the plurality of openings 33K.

Next, a method of manufacturing a secondary battery will be described. The secondary battery is manufactured, for example, by the following procedure.

When fabricating the positive electrode 21, first, a positive electrode active material is, as necessary, mixed with a positive electrode binder, a positive electrode conductive agent, and the like to obtain a positive electrode mixture. Subsequently, the positive electrode mixture is dispersed in, for example, an organic solvent to obtain a positive electrode mixture slurry paste. Finally, both surfaces of the positive electrode current collector 21A are coated with the positive electrode mixture slurry, and thereafter, the coated positive electrode mixture slurry is dried to form the positive electrode active material layer 21B. Thereafter, as necessary, the positive electrode active material layer 21B may be compression-molded by using, for example, a roll pressing machine. In this case, the positive electrode active material layer 21B may be heated or may be compression-molded a plurality of times.

When fabricating the negative electrode 22, the negative electrode active material layer 22B may be formed on both surfaces of the negative electrode current collector 22A by a procedure similar to the foregoing procedure of fabricating the positive electrode 21. Specifically, the negative electrode active material, and, for example, an anode binder and the negative electrode conductive agent are mixed to obtain a negative electrode mixture. Subsequently, the negative electrode mixture is dispersed in, for example, an organic solvent to obtain a negative electrode mixture slurry paste. Subsequently, both surfaces of the negative electrode current collector 22A may be coated with the negative electrode mixture slurry, and thereafter, the coated negative electrode mixture slurry is dried to form the negative electrode active material layer 22B. Thereafter, as necessary, the negative electrode active material layer 22B is compression-molded by using, for example, a roll pressing machine.

When the secondary battery is assembled, the positive electrode lead 25 is coupled to t positive electrode current collector 21A by, for example, a welding method, and the negative electrode lead 26 is coupled to the negative electrode current collector 22A by, for example, a welding method. Subsequently, the positive electrode 21 and the negative electrode 22 are stacked with the separator 23 interposed therebetween, and the stacked positive electrode 21, negative electrode 22, and separator 23 are then wound to form the wound electrode body 20. Subsequently, the center pin 24 is inserted into the winding space 20C of the wound electrode body 20.

Subsequently, the wound electrode body 20 is sandwiched between the insulating plates 12 and 13 constituting the pair and is contained inside the battery can 11 together with the pair of insulating plates 12 and 13. In this case, one end of the positive electrode lead 25 is coupled to the safety valve mechanism 30 (sub-disc 34) by, for example, a welding method, and one end of the negative electrode lead 26 is coupled to the battery can 11 by, for example, a welding method. Subsequently, the electrolytic solution is injected into the battery can 11, and the wound electrode body 20 is impregnated with the injected electrolytic solution. Finally, the battery lid 14, the positive temperature coefficient device 15, and the safety valve mechanism 30 are crimped with the gasket 16 at the open end 11N of the battery can 11. Thereby, a secondary battery provided with the safety valve mechanism 30 is completed.

According to the secondary battery (lithium ion secondary battery), the safety valve mechanism 30 includes the safety cover 31 and the sub-disc 34 electrically coupled to each of the safety cover 31 and the wound electrode body 20. The cleavage groove 34M is provided in the sub-disc 34 in the peripheral region of the coupling portion 34C physically coupled to the safety cover 31. Thus, safety can be improved for the reason described below.

If the sub-disc 34 is not provided with the cleavage groove 34M, whether or not the electrical decoupling between the battery lid 14 and the wound electrode body 20 is provided when the internal pressure of the battery can 11 increases depends on the coupling strength between the safety cover 31 and the sub-disc 34. The "coupling strength" is, for example, welding strength when the safety cover 31 is welded to the sub-disc 34.

Specifically, when the coupling strength between the safety cover 31 and the sub-disc 34 is low, if the internal pressure of the battery can 11 increases, the safety cover 31 tends to be physically separated from the sub-disc 34, and the electrical decoupling between the battery lid 14 and the wound electrode body 20 tends to be provided. On the other hand, when the coupling strength between the safety cover 31 and the sub-disc 34 is high, even if the internal pressure of the battery can 11 increases, the safety cover 31 is less likely to be physically separated from the sub-disc 34, and the electrical decoupling between the battery lid 14 and the wound electrode body 20 is less likely to be provided.

In this case, pressure (the internal pressure of the battery can 11) required to provide the electrical decoupling between the battery lid 14 and the wound electrode body 20 varies due to a variation in the coupling strength between the safety cover 31 and the sub-disc 34, and the safety valve mechanism 30 is less likely to be operated with good reproducibility. Thus, the operation stability of the safety valve mechanism 30 is reduced, and as a result it is difficult to improve the safety.

On the other hand, when the sub-disc 34 is provided with the cleavage groove 34M, whether or not the electrical decoupling between the battery lid 14 and the wound electrode body 20 is provided when the internal pressure of the battery can 11 increases does not depend on the coupling strength between the safety cover 31 and the sub-disc 34 but depends on the ease of cleavage of the sub-disc 34 in accordance with the cleavage groove 34M.

In this case, when the internal pressure of the battery can 11 increases, the sub-disc 34 can easily cleave as a result of the cleavage groove 34M regardless of the coupling strength between the safety cover 31 and the sub-disc 34. Consequently, when the internal pressure of the battery can 11 has reached a certain value, the sub-disc 34 can easily and stably open, and the safety valve mechanism 30 can easily operate with good reproducibility. Thus, the operation stability of the safety valve mechanism 30 is improved, and as a result, the safety can be improved.

In particular, if the cleavage groove 34M has an annular shape surrounding the coupling portion 34C, more specifically, if the cleavage groove 34M has a ring shape, the sub-disc 34 can easily and stably cleave, and as a result, a higher effect can be obtained.

In addition, if the cleavage groove 34M is provided in the lower surface 34A of the sub-disc 34, the sub-disc 34 can easily cleave as a result of the cleavage groove 34M when the internal pressure of the battery can 11 increases, and as a result, a higher effect can be obtained.

When the safety cover 31 has the protrusion 31T physically coupled to the sub-disc 34 at the coupling portion 34C, if the safety valve mechanism includes the stripper disc 33 having the opening 33K for the protrusion 31T to pass through and the cleavage groove 34M is provided in a region of the sub-disc 34 corresponding to the opening 33K, the electrical decoupling between the battery lid 14 and the wound electrode body 20 can be easily provided, and as a result, a higher effect can be obtained.

When the thickness T1 of the sub-disc 34 is 0.05 mm to 0.30 mm, the thickness T2 of the sub-disc 34 is 0.02 mm to 0.07 mm, the ratio T2/T1 is 0.2 to 0.7, or the inner diameter D of the ring-shaped cleavage groove 34M is 0.6 mm to 1.8 mm, the operating pressure of the safety valve mechanism 30 is optimized. Thus, the operation stability of the safety valve mechanism 30 is further improved, and as a result, a higher effect can be obtained.

If the operating pressure (current interruption operating pressure) P of the safety valve mechanism 30 calculated using the multiple correlation equation shown in equation (1) is 8 $kgf/cm^2$ to 28 $kgf/cm^2$, the safety valve mechanism 30 can be easily operated appropriately, for example, when the secondary battery is stored at a high temperature and when the secondary battery is overcharged. Thus, the operation stability of the safety valve mechanism 30 is ensured, and as a result, a higher effect can be obtained.

Next, another secondary battery of an embodiment of the present technology will be described. In the following description, the constituent elements of the lithium ion secondary battery that have been already described are cited where appropriate.

The secondary battery described here is a cylindrical lithium metal secondary battery in which the battery capacity (capacitance of the negative electrode) is obtained using a lithium metal precipitation phenomenon and a lithium metal dissolution phenomenon.

The secondary battery has a configuration similar to that of the foregoing lithium-ion secondary battery, and operates similarly to the lithium ion secondary battery, except that the negative electrode active material layer 22B is formed of the lithium metal. Further, the secondary battery is fabricated by a similar fabrication procedure to that of the lithium ion secondary battery except that the negative electrode active material layer 22B is formed using lithium metal.

In the secondary battery, the lithium metal is used as a negative electrode active material, and a high energy density is thus achievable. The negative electrode active material layer 22B may already exist at the time of assembling the secondary battery, for example. Alternatively, for example, the negative electrode active material layer 22B may not exist at the time of assembling the secondary battery and may be formed of lithium metal precipitated during charging. In this case, for example, it is possible that the negative electrode active material layer 22B formed of lithium metal is used as a current collector, and the negative electrode current collector 22A may be omitted.

The secondary battery operates as follows. When the secondary battery is charged, for example, lithium ions are released from the positive electrode 21, and the lithium ions are precipitated as the lithium metal on the surface of the negative electrode 22 (negative electrode current collector 22A) through the electrolytic solution. On the other hand, when the secondary battery is discharged, for example, lithium metal is eluted as lithium ions into the electrolytic solution from the negative electrode 22 (negative electrode active material layer 22B), and the lithium ions are absorbed into the positive electrode 21 through the electrolytic solution.

According to the secondary battery (lithium metal secondary battery), similarly to the above-described lithium ion secondary battery, the safety valve mechanism 30 including the safety cover 31 and the sub-disc 34 provided with the cleavage groove 34M is provided. Therefore, similarly to the lithium ion secondary battery, the operation stability of the safety valve mechanism 30 is improved, and as a result, the safety can be improved.

Other operation and effects of the lithium metal secondary battery are similar to those of the lithium ion secondary battery.

The configuration of the secondary battery described above can be changed as appropriate.

Modification Example 1

Figure 11:
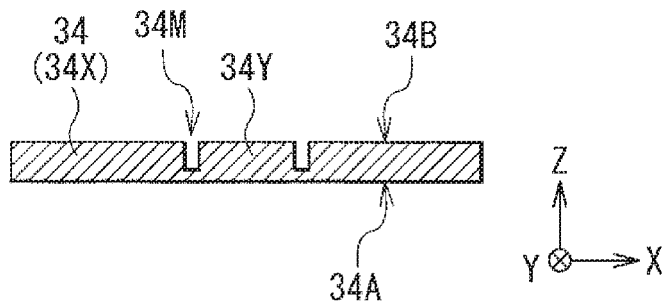
FIG. 11 is a sectional view illustrating a configuration of the sub-disc (cleavage groove formation position) according to an embodiment of the present technology.
Figure 12:
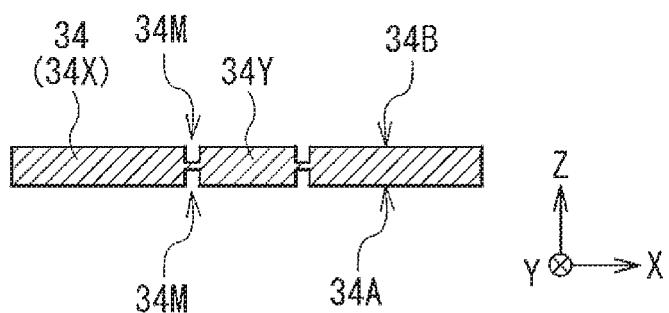
FIG. 12 is a sectional view illustrating a configuration of the sub-disc (cleavage groove formation position) according to an embodiment of the present technology.

Specifically, the position where the cleavage groove 34M is formed is not limited to the lower surface 34A of the sub-disc 34, as described above. Thus, for example, as illustrated in FIG. 11 corresponding to FIG. 4, the cleavage groove 34M may be provided in the upper surface 34B of the sub-disc 34. For example, as illustrated in FIG. 12 corresponding to FIG. 4, the cleavage grooves 34M may be provided in both the lower surface 34A and the upper surface 34B of the sub-disc 34. Also in these cases, since the sub-disc 34 cleaves as a result of the cleavage groove 34M, a similar effect can be obtained.

It goes without saying that when the cleavage grooves 34M are provided in both the lower surface 34A and the upper surface 34B, the depth S of the cleavage groove 34M provided in the lower surface 34A can be set selectively, and the depth S of the cleavage groove 34M provided in the upper surface 34B can also be set selectively. That is, the depth S of the cleavage groove 34M provided in the lower surface 34A and the depth S of the cleavage groove 34M provided in the upper surface 34B may be the same as or different from each other.

Modification Example 2

Figure 13:
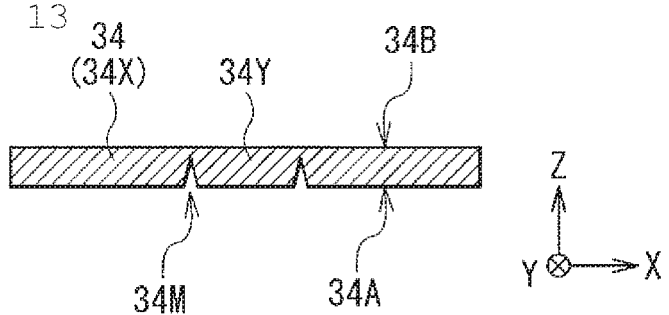
FIG. 13 is a sectional view illustrating a configuration of the sub-disc (sectional shape of the cleavage groove) according to an embodiment of the present technology.
Figure 14:
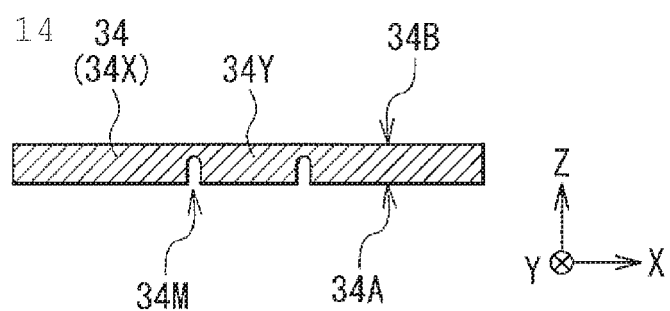
FIG. 14 is a sectional view illustrating a configuration of the sub-disc (sectional shape of the cleavage groove) according to an embodiment of the present technology.

The sectional shape of the cleavage groove 34M is not limited to a rectangle (box shape) as described above. Thus, for example, as illustrated in FIG. 13 corresponding to FIG. 4, the sectional shape of the cleavage groove 34M may be triangle. For example, as illustrated in FIG. 14 corresponding to FIG. 4, the sectional shape of the cleavage groove 34M may be a shape including a curved portion. The shape including the curved portion includes, for example, a shape in which a rectangle (box shape) and a semicircle are combined. Also in these cases, since the sub-disc 34 cleaves as a result of the cleavage groove 34M, a similar effect can be obtained.

Modification Example 3

Figure 15:
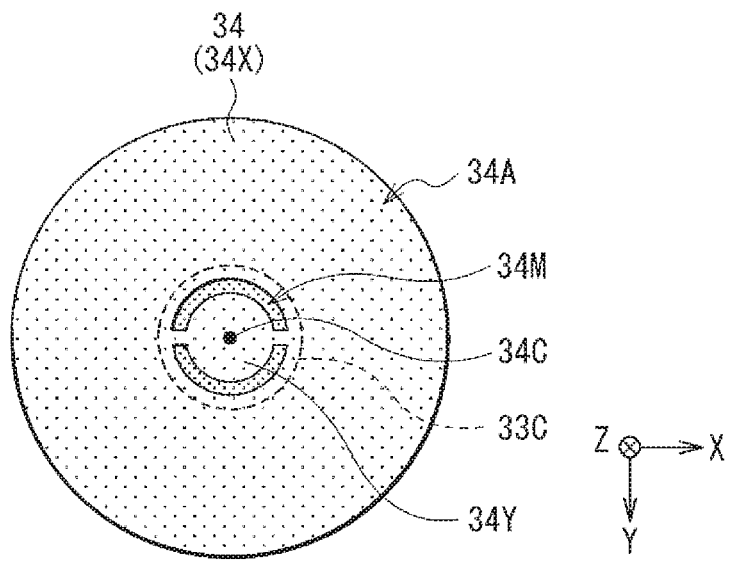
FIG. 15 is a plane view illustrating a configuration of the sub-disc (cleavage groove formation range) according to an embodiment of the present technology.

The range where the cleavage groove 34M is formed might not be provided in the entire peripheral region of the coupling portion 34C as described above. In other words, the cleavage groove 34M may not be an annular groove. Thus, the cleavage groove 34M may be provided in part of the peripheral region of the coupling portion 34C. Specifically, for example, as illustrated in FIG. 15 corresponding to FIG. 5, the cleavage groove 34M may be divided at one or two or more places. Herein, the ring-shaped cleavage groove 34M is divided at two positions, for example. Thus, on the lower surface 34A of the sub-disc 34, for example, the two arc-shaped cleavage grooves 34M are provided. Also in this case, since the sub-disc 34 cleaves as a result of the cleavage groove 34M, a similar effect can be obtained.

However, in order to easily cleave the sub-disc 34 in accordance with the cleavage groove 34M, it is preferable that the cleavage groove 34M be provided in the entire peripheral region of the coupling portion 34C as described above. That is, since the cleavage groove 34M surrounds the coupling portion 34C, the cleavage groove 34M is preferably an annular groove.

Next, description is given to application examples of the foregoing secondary battery.

Application of a secondary battery is not particularly limited as long as the secondary battery is applied to a machine, a device, an appliance, an apparatus, a system (collective entity of a plurality of devices and the like), or the like that is capable of using the secondary battery as a driving electric power source, an electric power storage source for electric power accumulation, or the like. The secondary battery usable as an electric power source may be a main electric power source or may be an auxiliary electric power source. The main electric power source is an electric power source used preferentially regardless of whether other power sources are provided. The auxiliary electric power source may be, for example, an electric power source used instead of the main electric power source or an electric power source used by being switched from the main electric power source as necessary. When the secondary battery is used as the auxiliary electric power source, the kind of main electric power source is not limited to the secondary battery.

Examples of application of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include a mobile daily electric appliance such as an electric shaver; a storage device such as a backup electric power source and a memory card; an electric power tool such as an electric drill and an electric saw; a battery pack usable as an attachable and detachable electric power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the examples described above.

In particular, the secondary battery is effectively applicable to the battery pack, the electric vehicle, the electric power storage system, the electric power tool, the electronic apparatus, or the like. Since good battery characteristics are demanded in these applications, performance can be effectively improved by using the secondary battery of the present technology. The battery pack is an electric power source including the secondary battery. As will be described later, the battery pack may include a single battery or an assembled battery. The electric vehicle is a vehicle that drives (runs) by using the secondary battery as a driving electric power source, and as described above, the electric vehicle may be an automobile (such as a hybrid automobile) including a drive source other than the secondary battery. The electric power storage system is a system including the secondary battery as an electric power storage source. For example, in a home electric power storage system, electric power accumulates in the secondary battery as an electric power storage source, and therefore, home electric products and the like can be used using the electric power. The electric power tool is a tool in which a movable section (such as a drill) is movable by using the secondary battery as a driving electric power source. The electronic apparatus is an apparatus executing various functions by using the secondary battery as a driving electric power source (electric power supply source).

Herein, some application examples of the secondary battery are specifically described. The configurations of the application examples described below are merely examples, and may be changed as appropriate.

Figure 16:
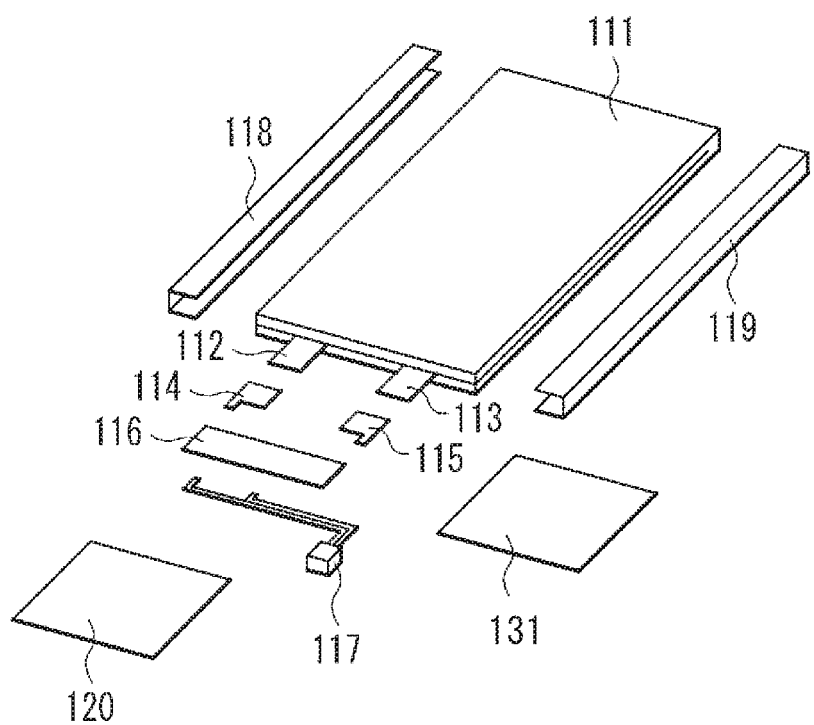
FIG. 16 is a perspective view illustrating a configuration of an application example (a battery pack: single battery) of the secondary battery according to an embodiment of the present technology.
Figure 17:
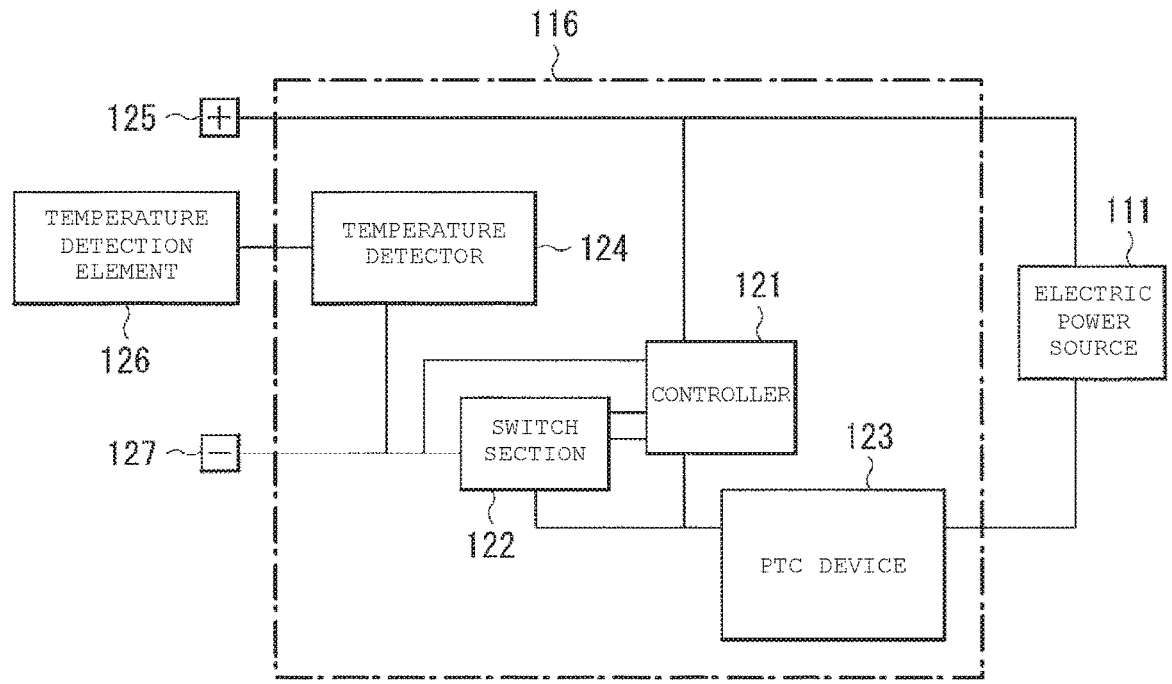
FIG. 17 is a block diagram illustrating a configuration of the battery pack illustrated in FIG. 16.

FIG. 16 illustrates a perspective configuration of a battery pack including a single battery. FIG. 17 illustrates a block configuration of the battery pack illustrated in FIG. 16. FIG. 16 illustrates a state where the battery pack is disassembled.

The battery pack described herein is a simple battery pack (so-called soft pack) including single secondary battery and is mounted in, for example, an electronic apparatus typified by a smartphone. For example, the battery pack includes an electric power source 111 that is a laminated-film-type secondary battery, and a circuit board 116 coupled to the electric power source 111, as illustrated in FIG. 16. A positive electrode lead 112 and a negative electrode lead 113 are attached to the electric power source 111.

Adhesive tapes 118 and 119 constituting a pair are attached to both side surfaces of the electric power source 111. A protection circuit module (PCM) is formed on the circuit board 116. The circuit board 116 is coupled to the positive electrode lead 112 through a tab 114 and is coupled to a negative electrode lead 113 through a tab 115. Moreover, the circuit board 116 is coupled to a lead wire 117 provided with a connector for external connection. In a state in which the circuit board 116 is coupled to the electric power source 111, the circuit board 116 is protected by a label 120 and an insulating sheet 131. The label 120 is attached to the circuit board 116 to fix, for example, the circuit board 116 and the insulating sheet 131.

For example, the battery pack includes the electric power source 111 and the circuit board 116 as illustrated in FIG. 17. The circuit board 116 includes, for example, a controller 121, a switch section 122 (switch), a device 123, and a temperature detector 124. The electric power source 111 can be coupled to an external electric power source through a positive electrode terminal 125 and a negative electrode terminal 127, and the electric power source 111 is thus charged and discharged through the positive electrode terminal 125 and the negative electrode terminal 127. The temperature detector 124 detects a temperature by using a temperature detection terminal (so-called T terminal) 126.

The controller 121 controls operation of the entire battery pack (including a state of the electric power source 111 being used). The controller 121 includes, for example, a central processing unit (CPU) and a memory.

For example, in the case where a battery voltage reaches an overcharge detection voltage, the controller 121 causes the switch section 122 to be disconnected so that a charge current does not flow into a current path of the electric power source 111. Moreover, for example, in the case where a large current flows during charging, the controller 121 causes the switch section 122 to be disconnected, thereby blocking the charge current.

On the other hand, for example, in the case where a battery voltage reaches an over discharge detection voltage, the controller 121 causes the switch section 122 to be disconnected so that a discharge current does not flow into the current path of the electric power source 111. Moreover, for example, in the case where a large current flows during discharging, the controller 121 causes the switch section 122 to be disconnected, thereby blocking the discharge current.

The overcharge detection voltage is not particularly limited and is, for example, 4.2 V±0.05 V, and the over discharge detection voltage is not particularly limited and is, for example, 2.4 V±0.1 V.

The switch section 122 switches the state of the electric power source 111 being used, that is, whether or not the electric power source 111 is coupled to an external device, in accordance with an instruction from the controller 121. The switch section 122 includes, for example, a charge control switch and a discharge control switch. The charge control switch and the discharge control switch are each, for example, a semiconductor switch such as a field-effect transistor (MOSFETT) using a metal oxide semiconductor. Charge and discharge currents are, for example, detected based on on-resistance of the switch section 122.

The temperature detector 124 measures a temperature of the electric power source 111, and outputs a measurement result of the temperature to the controller 121. The temperature detector 124 includes, for example, a temperature detection element such as a thermistor. The measurement result of the temperature measured by the temperature detector 124 is used, for example, in the case where the controller 121 performs charge and discharge control at the time of abnormal heat generation and in the case where the controller 121 performs a correction process at the time of calculating remaining capacity.

The circuit board 116 may not include the PTC device 123. In this case, a PTC device may be separately attached to the circuit board 116.

Figure 18:
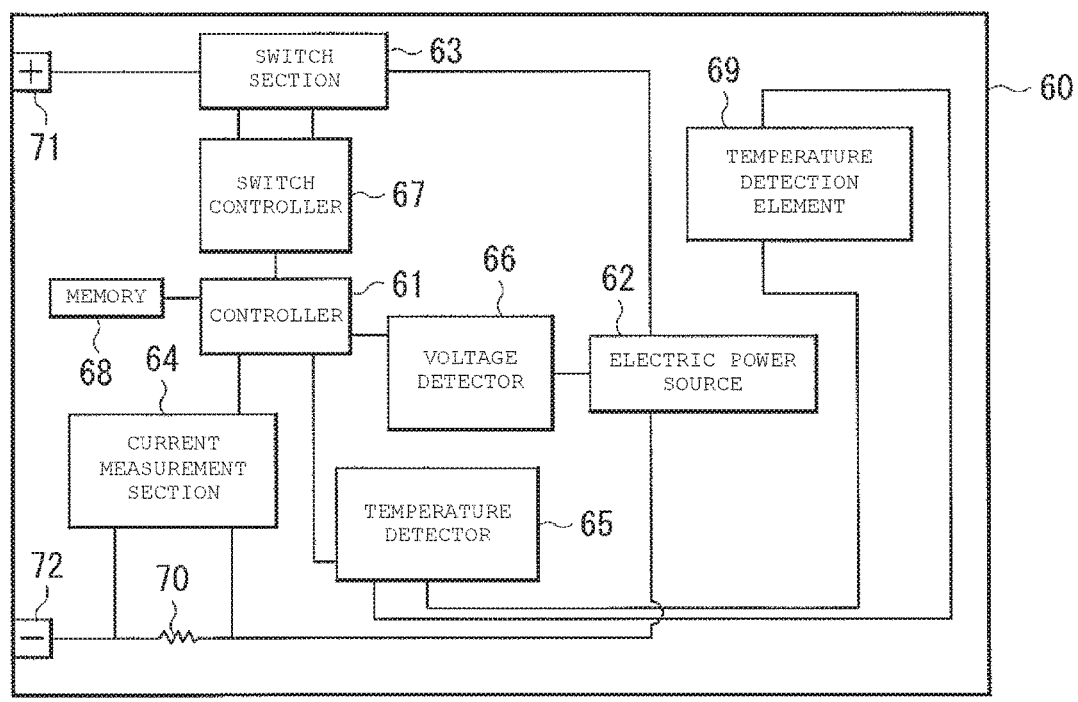
FIG. 18 is a block diagram illustrating a configuration of an application example (a battery pack: assembled battery) of the secondary battery according to an embodiment of the present technology.

FIG. 18 illustrates a block configuration of a battery pack including an assembled battery.

For example, the battery pack includes a controller 61, an electric power source 62, a switch section 63, a current measurement section 64, a temperature detector 65, a voltage detector 66, a switch controller 67, a memory 68, a temperature detection element 69, a current detection resistance 70, a positive electrode terminal 71, and a negative electrode terminal 72 in a housing 60. The housing 60 contains, for example, a plastic material.

The controller 61 controls operation of the entire battery pack (including a state of the electric power source 62 being used). The controller 61 includes, for example, a CPU. The electric power source 62 is an assembled battery including two or more secondary batteries, and the two or more secondary batteries may be connected in series, in parallel, or in series-parallel combination. For example, the electric power source 62 includes six secondary batteries in which two sets of series-connected three batteries are connected in parallel to each other.

The switch section 63 switches the state of the electric power source 62 being used, that is, whether or not the electric power source 62 is coupled to an external device, in accordance with an instruction from the controller 61. The switch section 63 includes, for example, a charge control switch, a discharge control switch, a charging diode, and a discharging diode. The charge control switch and the discharge control switch are each, for example, a semiconductor switch such as a field-effect transistor (MOSFET) using a metal oxide semiconductor.

The current measurement section 64 measures a current by using the current detection resistance 70, and outputs a measurement result of the current to the controller 61. The temperature detector 65 measures temperature by using the temperature detection element 69, and outputs a measurement result of the temperature to the controller 61. The measurement result of the temperature is used, for example, in the case where the controller 61 performs charge and discharge control at the time of abnormal heat generation and in the case where the controller 61 performs a correction process at the time of calculating remaining capacity. The voltage detector 66 measures a voltage of the secondary battery in the electric power source 62, performs analog-to-digital conversion on the measured voltages, and supplies the resultant to the controller 61.

The switch controller 67 controls operation of the switch section 63 in accordance with signals input respectively from the current measurement section 64 and the voltage detector 66.

For example, in the case where a battery voltage reaches an overcharge detection voltage, the switch controller 67 causes the switch section 63 (charge control switch) to be disconnected so that a charge current does not flow into a current path of the electric power source 62. This makes it possible to perform only discharge through the discharging diode in the electric power source 62. For example, when a large current flows during charging, the switch controller 67 blocks the charge current.

For example, in the case where a battery voltage reaches an over discharge detection voltage, the switch controller 67 causes the switch section 63 (discharge control switch) to be disconnected so that a discharge current does not flow into the current path of the electric power source 62. This makes it possible to perform only charge through the charging diode in the electric power source 62. For example, when a large current flows during discharging, the switch controller 67 blocks the discharge current.

The overcharge detection voltage is not particularly limited and is, for example, 4.2 V±0.05 V, and the over discharge detection voltage is not particularly limited and is, for example, 2.4 V±0.1 V.

The memory 68 includes, for example, an EEPROM as a non-volatile memory. The memory 68 stores, for example, numerical values calculated by the controller 61 and information (such as an internal resistance in an initial state) of the secondary battery measured in a manufacturing process. When the memory 68 stores full charge capacity of the secondary battery, the controller 61 is able to comprehend information such as remaining capacity.

The temperature detection element 69 measures a temperature of the electric power source 62, and outputs a measurement result of the temperature to the controller 61. The temperature detection element 69 includes, for example, a thermistor.

The positive electrode terminal 71 and the negative electrode terminal 72 are terminals coupled to an external device (such as a notebook personal computer) driven using the battery pack and an external device (such as a battery charger) usable for charging the battery pack. The electric power source 62 is charged and discharged through the positive electrode terminal 71 and the negative electrode terminal 72.

Figure 19:
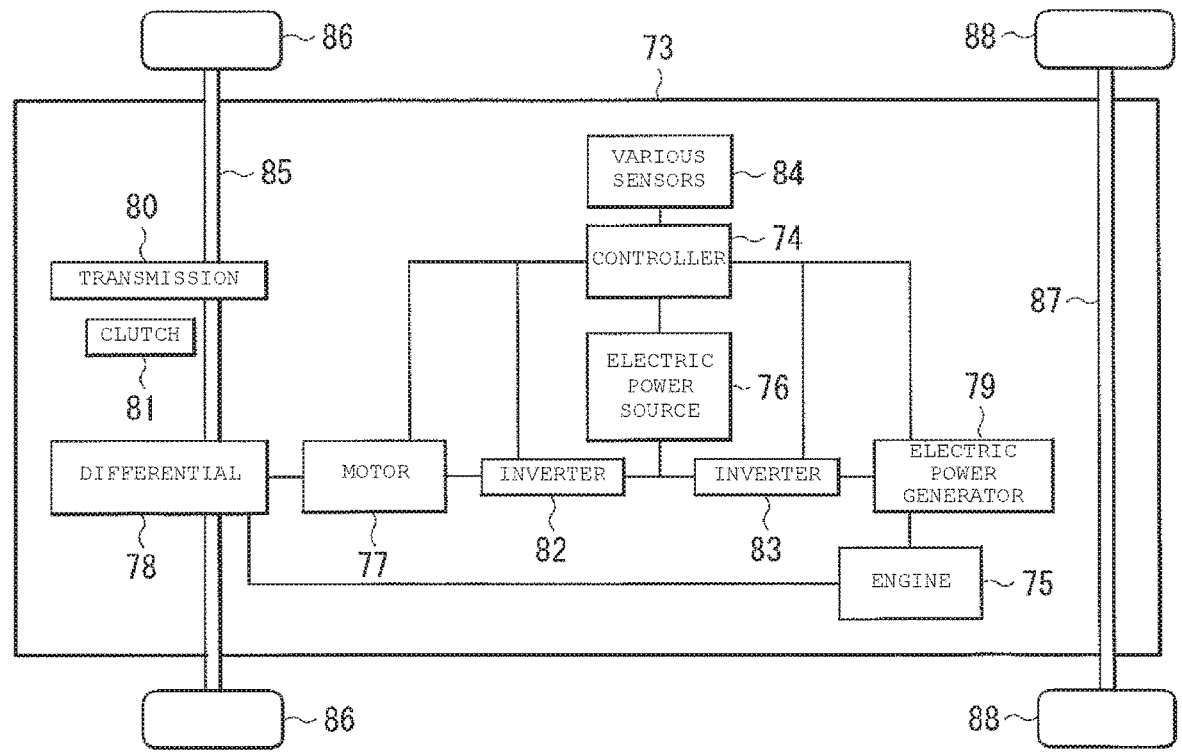
FIG. 19 is a block diagram illustrating a configuration of an application example (an electric vehicle) of the secondary battery according to an embodiment of the present technology.

FIG. 19 illustrates a block configuration of a hybrid automobile as an example of an electric vehicle.

For example, the electric vehicle includes a controller 74, an engine 75, an electric power source 76, a driving motor 77, a differential 78, an electric power generator 79, a transmission 80, a clutch 81, inverters 82 and 83, and various sensors 84 inside a housing 73 made of metal. Other than the components mentioned above, the electric vehicle includes, for example, a front drive shaft 85 and a pair of front wheels 86 that are coupled to the differential 78 and the transmission 80, and a rear drive shaft 87, and a pair of rear wheels 88.

The electric vehicle can run by using one of the engine 75 and the motor 77 as a drive source, for example. The engine 75 is a main power source, and is, for example, a gasoline engine. In the case where the engine 75 is used as a power source, drive power (torque) of the engine 75 is transferred to the pair of front wheels 86 and the pair of rear wheels 88 through the differential 78, the transmission 80, and the clutch 81 as drive sections (driver), for example. Since the torque of the engine 75 is transferred to the electric power generator 79, the electric power generator 79 generates alternating-current electric power by using the torque, and since the alternating-current electric power is converted into direct-current electric power through the inverter 83, the direct-current electric power accumulates in the electric power source 76. In contrast, in the case where the motor 77 that is a conversion section (converter) is used as a power source, electric power (direct-current electric power) supplied from the electric power source 76 is converted into alternating-current electric power through the inverter 82, and therefore, the motor 77 is driven by using the alternating-current electric power. Drive power (torque) obtained by converting the electric power by the motor 77 is transferred to the pair of front wheels 86 and the pair of rear wheels 88 through the differential 78, the transmission 80, and the clutch 81 as the drive sections, for example.

When speed of the electric vehicle is reduced by a brake mechanism, resistance at the time of deceleration is transferred to the motor 77 as torque, and thus the motor 77 may generate alternating-current electric power by utilizing the torque. Since the alternating-current electric power is converted into direct-current electric power through the inverter 82, it is preferable that the direct-current regenerative electric power accumulate in the electric power source 76.

The controller 74 controls operation of the entire electric vehicle. The controller 74 includes, for example, a CPU. The electric power source 76 includes one or two or more secondary batteries. The electric power source 76 may be coupled to an external power source, receive electric power supply from the external electric power source, and accumulate electric power. The various sensors 84 are used, for example, for controlling the number of revolutions of the engine 75 and for controlling opening level (throttle opening level) of a throttle valve. The various sensors 84 include, for example, one or two or more of a speed sensor, an acceleration sensor, and an engine speed sensor.

The description has been given to a case where the electric vehicle is the hybrid automobile, however, the electric vehicle may be a vehicle (an electric automobile) that drives by using only the electric power source 76 and the motor 77 without using the engine 75.

Figure 20:
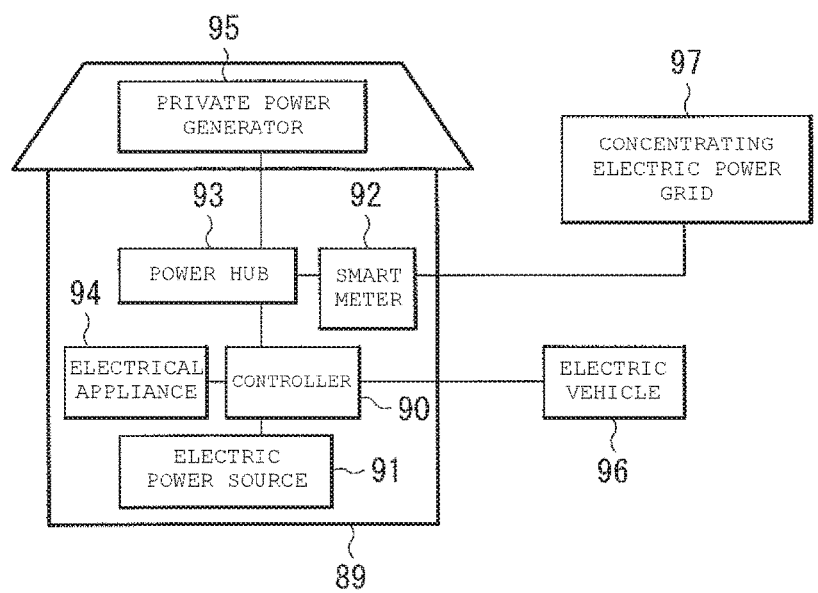
FIG. 20 is a block diagram illustrating a configuration of an application example (an electric power storage system) of the secondary battery according to an embodiment of the present technology.

FIG. 20 illustrates a block configuration of an electric power storage system.

For example, the electric power storage system includes a controller 90, an electric power source 91, a smart meter 92, and a power hub 93 inside a house 89 such as a general residence or a commercial building.

In this case, the electric power source 91 may be coupled to, for example, an electrical appliance 94 provided inside the house 89, and may be coupled to an electric vehicle 96 parked outside the house 89. Further, for example, the electric power source 91 may be coupled to a private power generator 95 provided in the house 89 through the power hub 93, and may be allowed to be coupled to an outside concentrating electric power grid 97 through the smart meter 92 and the power hub 93.

The electrical appliance 94 includes, for example, one or two or more home electric products such as a refrigerator, an air conditioner, a television, and a water heater. The private power generator 95 includes, for example, one or two or more of a solar power generator, a wind-power generator, and the like. The electric vehicle 96 includes, for example, one or two or more of an electric automobile, an electric motorcycle, a hybrid automobile, and the like. The concentrating electric power grid 97 includes, for example, one or two or more of a thermal power plant, an atomic power plant, a hydraulic power plant, a wind-power plant, and the like.

The controller 90 controls operation of the entire electric power storage system including a state of the electric power source 91 being used). The controller 90 includes, for example, a CPU. The electric power source 91 includes one or two or more secondary batteries. The smart meter 92 is, for example, an electric power meter that is compatible with a network and is provided in the house 89 demanding electric power, and may be communicable with an electric power supplier. Accordingly, for example, while the smart meter 92 communicates with outside, the smart meter 92 controls the balance between supply and demand in the house 89, which allows effective and stable energy supply.

In the electric power storage system, for example, electric power may accumulate in the electric power source 91 from the concentrating electric power grid 97 as an external electric power source through the smart meter 92 and the power hub 93, and electric power accumulates in the electric power source 91 from the private power generator 95 as an independent electric power source through the power hub 93. The electric power accumulated in the electric power source 91 is supplied to the electrical appliance 94 and the electric vehicle 96 in accordance with an instruction from the controller 90, and the electrical appliance 94 thus becomes operable, and the electric vehicle 96 thus becomes chargeable. In other words, the electric power storage system is a system that makes it possible to accumulate and supply electric power in the house 89 by using the electric power source 91.

The electric power accumulated in the electric power source 91 is usable as required. Thus, for example, electric power accumulates in the electric power source 91 from the concentrating electric power grid 97 in the middle of night when an electric rate is inexpensive, and the electric power accumulated in the electric power source 91 may be used during daytime hours when the electric rate is expensive.

The foregoing electric power storage system may be provided for each household (family unit) or may be provided for a plurality of households (a plurality of family units).

Figure 21:
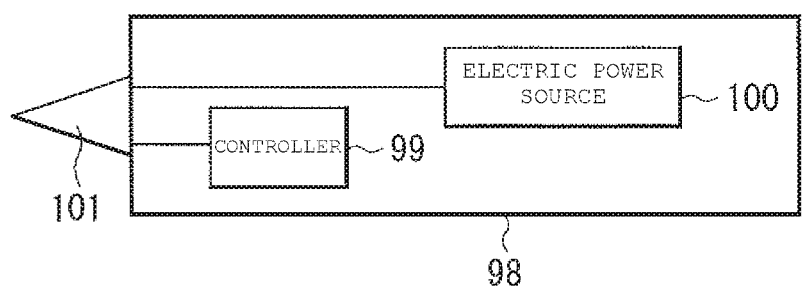
FIG. 21 is a block diagram illustrating a configuration of an application example (an electric power tool) of the secondary battery according to an embodiment of the present technology.

FIG. 21 illustrates a block configuration of an electric power tool.

The electric power tool described herein is, for example, an electric drill. The electric power tool includes, for example, a controller 99 and an electric power source 100 inside a tool body 98. For example, a drill section 101 as a movable section is attached to the tool body 98 in an operable (rotatable) manner.

The tool body 98 contains, for example, a plastic material. The controller 99 controls operation of the entire electric power tool (including a state of the electric power source 100 being used). The controller 99 includes, for example, a CPU. The electric power source 100 includes one or two or more secondary batteries. The controller 99 enables electric power to be supplied from the electric power source 100 to the drill section 101 in accordance with an operation of an operation switch.

Description is given to examples of the present technology.

Experimental Examples 1-1 and 1-2

A cylindrical secondary battery (lithium ion secondary battery) illustrated in FIGS. 1 to 6 was fabricated by the following procedure.

In the case of fabricating the positive electrode 21, first, 94 parts by mass of a positive electrode active material (LiCoO$_2$), 3 parts by mass of a positive electrode binder (polyvinylidene fluoride), and 3 parts by mass of a positive electrode conductive agent (graphite) were mixed to obtain a positive electrode mixture. Subsequently, the positive electrode mixture was charged in an organic solvent (N-methyl-2-pyrrolidone), and the organic solvent was then stirred to obtain a paste-like positive electrode mixture slurry. Subsequently, both surfaces of the positive electrode current collector 21A (a strip-shaped aluminum foil, thickness of 15 μm) were coated with the positive electrode mixture slurry by using a coating apparatus, and thereafter, the positive electrode mixture slurry was dried to form the positive electrode active material layer 21B. Finally, the positive electrode active material layer 21B was compression-molded by using a roll pressing machine.

In the case of fabricating the negative electrode 22, 95 parts by mass of a negative electrode active material (graphite), 3 parts by mass of a negative electrode binder (polyvinylidene fluoride), and 2 parts by mass of a negative electrode conductive agent (carbon black) were first mixed to obtain a negative electrode mixture. Subsequently, the negative electrode mixture was dispersed in an organic solvent (N-methyl-2-pyrrolidone) to obtain a paste-like negative electrode mixture slurry. Subsequently, both surfaces of the negative electrode current collector 22A (a strip-shaped copper foil, thickness of 15 μm) were coated with the negative electrode mixture slurry by using a coating apparatus, and thereafter, the negative electrode mixture slurry was dried to form the negative electrode active material layer 22B. Finally, the negative electrode active material layer 22B was compression-molded by using a roll pressing machine.

In the case of preparing the electrolytic solution, after an electrolytic salt ($LiPF_6$) was added to a solvent (ethylene carbonate, ethyl methyl carbonate, and dimethyl carbonate), the solvent was then stirred. In this case, a mixing ratio (weight ratio) of the solvent was ethylene carbonate:ethyl methyl carbonate:dimethyl carbonate=20:20:60, and the content of the electrolytic salt in the solvent was set to 1 mol/kg.

In the case where the secondary battery is assembled, first, the aluminum positive electrode lead 25 was welded to the positive electrode current collector 21A, and the nickel negative electrode lead 26 was welded to the negative electrode current collector 22A. Subsequently, the positive electrode 21 and the negative electrode 22 were stacked with the separator 23 (porous polyethylene film, thickness of 16 μm) interposed therebetween, and then, the stacked positive electrode 21, negative electrode 22, and separator 23 were wound to obtain a wound body. Subsequently, a winding end portion of the wound body was fixed using an adhesive tape to obtain the wound electrode body 20. Subsequently, the center pin 24 was inserted into the winding space 20C of the wound electrode body 20.

Subsequently, the safety valve mechanism 30 including the aluminum safety cover 31, the polypropylene disc holder 32, the aluminum stripper disc 33, and the aluminum sub-disc 34 in which the ring-shaped cleavage groove 34M was provided in the lower surface 34A was prepared. In the safety valve mechanism 30, a portion (protrusion 31T) of the safety cover 31 is subjected to ultrasonic welding and welded to the sub-disc 34. In this case, the thickness T1 is 0.1 mm, the thickness T2 is 0.03 mm, the depth S is 0.07 mm, the width W is 0.10 mm, and the inner diameter D is 1.2 mm.

For comparison, a safety valve mechanism 30 including an aluminum sub-disc 34 not provided with the cleavage groove 34M was also prepared. Whether the cleavage groove 34M is provided is shown in Table 1.

Subsequently, the wound electrode body 20 was housed in the nickel-plated iron battery can 11 while being sandwiched between the insulating plates 12 and 13 constituting the pair. In this case, one end of the positive electrode lead 25 was welded to the safety valve mechanism 30 (sub-disc 34), and one end of the negative electrode lead 26 was welded to the battery can 11. Subsequently, the electrolytic solution was injected into the battery can 11 by using a pressure reduction method, whereby the wound electrode body 20 was impregnated with the electrolytic solution. Finally, the battery lid 14, the positive temperature coefficient device 15, and the safety valve mechanism 30 were crimped with the gasket 16 at an open end of the battery can 11.

Thereby, a cylindrical secondary battery provided with the safety valve mechanism 30 was completed.

In order to evaluate the safety of the secondary battery, the operating characteristics of the safety valve mechanism 30 were examined, and the results shown in Table 1 were obtained.

When the operating characteristics of the safety valve mechanism 30 were examined, first, the internal pressure of the battery can 11 was intentionally increased by applying an external force to the vicinity of the center of the battery can 11 in a longitudinal direction. Subsequently, while the internal pressure of the battery can 11 was increased, the pressure at which the safety cover 31 (protrusion 31T) and the sub-disc 34 (outer peripheral portion 34X) were physically separated, that is, the pressure (current interruption operating pressure: $kgf/cm^2$) at which a current path was interrupted due to electrical decoupling between the battery lid 14 and the wound electrode body 20 was specified. In order to specify the current interruption operating pressure, a correlation between an external force and the current interruption operating pressure was examined in advance to specify a value of the current interruption operating pressure corresponding to a value of the external force when the current path was interrupted. In this case, using 30 secondary batteries, the operation of specifying the current interruption operating pressure was repeated 30 times (the number of tests was 30). Finally, a standard deviation 3σ ($kgf/cm^2$) of the current interruption operating pressure was calculated based on the specification result of the current interruption operating pressure (30 current interruption operating pressures).

TABLE 1

| Experimental Example | Cleavable groove | Standard deviation 3σ ($kgf/cm^2$) |
|---|---|---|
| 1-1 | Provided | 0.2 |
| 1-2 | Not Provided | 0.6 |

As shown in Table 1, the standard deviation 3σ of the current interruption operating pressure largely varied depending on whether the cleavage groove 34M is provided.

Specifically, when the sub-disc 34 was not provided with the cleavage groove 34M (Experimental Example 1-2), the current interruption operating pressure tended to vary due to a variation in the welding strength of the protrusion 31T with respect to the sub-disc 34. Thus, the standard deviation 3σ of the current interruption operating pressure was large (3σ=0.6).

On the other hand, when the sub-disc 34 was provided with the cleavage groove 34M (Experimental Example 1-1), the sub-disc 34 cleaved as a result of the cleavage groove 34M without depending on the welding strength of the protrusion 31T with respect to the sub-disc 34, so that the current interruption operating, pressure was less likely to vary. Thus, the standard deviation 3σ of the current interruption operating pressure was small (3σ=0.2). That is, the standard deviation 3σ in the case of using the cleavage groove 34M was ⅓ as compared with the standard deviation 3σ in the case of not using the cleavage groove 34M.

Experimental Examples 2-1 to 2-15

As shown in Table 2, a correlation between the current interruption operating pressure and the battery characteristics (storage characteristics and overcharge characteristics)

of the secondary battery was examined by changing the current interruption operating pressure. In this case, the current interruption operating pressure was changed by changing the depth S of the cleavage groove 34M.

In order to examine the storage characteristics, a storage success rate (%) was determined by conducting a severe high temperature storage test. The "severe high temperature storage test" is a test for confirming that due to water entering the battery can 11 in a fabrication process of the secondary battery, the safety valve mechanism 30 is unintentionally operated when the secondary battery is used under a high temperature environment, whereby the secondary battery becomes unusable.

Specifically, first, water was intentionally introduced into the battery can 11 to fabricate a secondary battery. In this case, the amount of water introduced was set to have a weight corresponding to 5% of the weight of the electrolytic solution. Subsequently, the secondary battery was charged until the voltage reached 4.5 V to put the secondary battery into a fully charged state, and the fully charged secondary battery was then stored (storage time was 100 hours) in a high temperature environment (environmental temperature was 60° C.). In this case, the number of secondary batteries used (the number of tests) was 100. Subsequently, the state of the safety valve mechanism 30 was checked visually to determine the state of the safety valve mechanism 30. In this case, when the safety valve mechanism 30 did not operate within a storage period, it was determined as "success", and when the safety valve mechanism 30 operated within the storage period, it was determined as "failure". Finally, the storage success rate (%)=(the number of successful secondary batteries/the number of tested secondary batteries)×100 was calculated.

In order to examine the overcharge characteristics, an overcharge success rate was determined by conducting a severe overcharge test.

Specifically, first, the secondary battery was repeatedly charged and discharged until the number of charge and discharge cycles reached 100 cycles. At the time of charging, the secondary battery was charged at a constant current of 0.2 C until the voltage reached 4.2 V, and thereafter, the secondary battery was charged at a constant voltage of 4.2 V until a current density reached 0.02 C. At the time of discharging, the secondary battery was discharged at a current density of 0.2 C until the voltage reached 2 V. Herein, "0.2 C" refers to a current value at which the battery capacity (theoretical capacity) is completely discharged in 5 hours, and "0.02 C" refers to a current value at which the battery capacity is completely discharged in 50 hours. Subsequently, the secondary battery was overcharged until the voltage reached 2.5 times a rated charging voltage. In this case, the number of secondary batteries used (the number of tests) was 100. Subsequently, the state of the secondary battery was confirmed visually to determine the state of the secondary battery. In this case, when the secondary battery did not rupture, ignite, or smoke, it was determined as "success", and when the secondary battery ruptured, ignited, or smoked, it was determined as "failure". Finally, the overcharge success rate (%)=(the number of successful secondary batteries/the number of tested secondary batteries)×100 was calculated.

TABLE 2

| Experimental Example | Current interruption operating pressure (kgf/cm$^2$) | Storage success rate (%) | Overcharge success rate (%) |
|---|---|---|---|
| 2-1 | 4 | 20 | 100 |
| 2-2 | 6 | 60 | 100 |
| 2-3 | 8 | 90 | 100 |
| 2-4 | 10 | 100 | 100 |
| 2-5 | 12 | 100 | 100 |
| 2-6 | 16 | 100 | 100 |
| 2-7 | 18 | 100 | 100 |
| 2-8 | 20 | 100 | 100 |
| 2-9 | 22 | 100 | 100 |
| 2-10 | 24 | 100 | 100 |
| 2-11 | 26 | 100 | 100 |
| 2-12 | 28 | 100 | 90 |
| 2-13 | 30 | 100 | 60 |
| 2-14 | 32 | 100 | 40 |
| 2-15 | 34 | 100 | 20 |

As shown in Table 2, each of the storage success rate and the overcharge success rate largely varied depending on the current interruption operating pressure. Specifically, the storage success rate increased as the current interruption operating pressure increased, whereas the overcharge success rate decreased as the current interruption operating pressure increased. In this case, when the current interruption operating pressure was 8 kgf/cm$^2$ to 28 kgf/cm$^2$ (Experimental Examples 2-3 to 2-12), a high storage success rate of 90% or more was obtained, and, at the same time, a high overcharge success rate of 90% or more was also obtained.

Thus, hereinafter, after an appropriate range of the current interruption operating pressure in which the operation stability of the safety valve mechanism 30 was ensured was set to 8 kgf/cm$^2$ to 28 kgf/cm2, influence of the configuration of the sub-disc 34 (thicknesses T1 and T2, ratio T2/T1, and inner diameter D) on the operating characteristics of the safety valve mechanism 30 was examined.

Experimental Examples 3-1 to 3-7

As shown in Table 3, the operating characteristics (current interruption operating pressure) of the safety valve mechanism 30 were examined by the same procedure except that the thickness T1 of the sub-disc 34 was changed.

TABLE 3

| Experimental Example | Thickness T1 (mm) | Thickness T2 (mm) | Inner diameter D (mm) | Current interruption operating pressure (kgf/cm$^2$) |
|---|---|---|---|---|
| 3-1 | 0.05 | 0.03 | 1.2 | 8 |
| 3-2 | 0.10 | 0.03 | 1.2 | 12 |
| 3-3 | 0.15 | 0.03 | 1.2 | 16 |
| 3-4 | 0.20 | 0.03 | 1.2 | 20 |
| 3-5 | 0.25 | 0.03 | 1.2 | 24 |
| 3-6 | 0.30 | 0.03 | 1.2 | 28 |
| 3-7 | 0.35 | 0.03 | 1.2 | 30 |

As shown in Table 3, the current interruption operating pressure largely varied depending on the thickness T1. Specifically, the current interruption operating pressure gradually increased as the thickness T1 increased. In this case, when the thickness T1 was 0.05 mm to 0.30 mm (Experimental Examples 3-1 to 3-6), the current interruption operating pressure within the appropriate range described above (that is, 8 kgf/cm$^2$ to 28 kgf/cm$^2$) was obtained.

Experimental Examples 4-1 to 4-8

As shown in Table 4, the operating characteristics (current interruption operating pressure) of the safety valve mechanism 30 were examined by the same procedure except that the thickness T2 of the sub-disc 34 was changed.

TABLE 4

| Experimental Example | Thickness T1 (mm) | Thickness T2 (mm) | Inner diameter D (mm) | Current interruption operating pressure (kgf/cm$^2$) |
|---|---|---|---|---|
| 4-1 | 0.1 | 0.01 | 1.2 | 4 |
| 4-2 | 0.1 | 0.02 | 1.2 | 8 |
| 4-3 | 0.1 | 0.03 | 1.2 | 12 |
| 4-4 | 0.1 | 0.04 | 1.2 | 16 |
| 4-5 | 0.1 | 0.05 | 1.2 | 20 |
| 4-6 | 0.1 | 0.06 | 1.2 | 24 |
| 4-7 | 0.1 | 0.07 | 1.2 | 28 |
| 4-8 | 0.1 | 0.08 | 1.2 | 30 |

As shown in Table 4, the current interruption operating pressure largely varied depending on the thickness T2. Specifically, the current interruption operating pressure gradually increased as the thickness T2 increased. In this case, when the thickness T2 was 0.02 mm to 0.07 mm (Experimental Examples 4-2 to 4-7), the current interruption operating pressure within the appropriate range described above (that is, 8 kgf/cm$^2$ to 28 kgf/cm$^2$) was obtained.

Experimental Examples 5-1 to 5-8

As shown in Table 5, the operating characteristics (current interruption operating pressure) of the safety valve mechanism 30 were examined by the same procedure except that the ratio T2/T1 of the thickness T2 to the thickness T1 was changed. Each of the thicknesses T1 and T2 set to change the ratio T2/T1 is as shown in Table 5.

TABLE 5

| Experimental Example | Thickness T1 (mm) | Thickness T2 (mm) | Ratio T2/T1 | Inner diameter D (mm) | Current interruption operating pressure (kgf/cm$^2$) |
|---|---|---|---|---|---|
| 5-1 | 0.1 | 0.01 | 0.1 | 1.2 | 4 |
| 5-2 | 0.1 | 0.02 | 0.2 | 1.2 | 8 |
| 5-3 | 0.1 | 0.03 | 0.3 | 1.2 | 12 |
| 5-4 | 0.1 | 0.04 | 0.4 | 1.2 | 16 |
| 5-5 | 0.1 | 0.05 | 0.5 | 1.2 | 20 |
| 5-6 | 0.1 | 0.06 | 0.6 | 1.2 | 24 |
| 5-7 | 0.1 | 0.07 | 0.7 | 1.2 | 28 |
| 5-8 | 0.1 | 0.08 | 0.8 | 1.2 | 30 |

As shown in Table 5, the current interruption operating pressure largely varied depending on the ratio T2/T1. Specifically, the current interruption operating pressure gradually increased as the ratio T2/T1 increased. In this case, when the ratio T2/T1 was 0.2 to 0.7 (Experimental Examples 5-2 to 5-7), the current interruption operating pressure within the appropriate range described above (that is, 8 kgf/cm$^2$ to 28 kgf/cm$^2$) was obtained.

Experimental Examples 6-1 to 6-5

As shown in Table 6, the operating characteristics (current interruption operating pressure) of the safety valve mechanism 30 were examined by the same procedure except that the inner diameter D of the sub-disc 34 was changed.

TABLE 6

| Experimental Example | Thickness T1 (mm) | Thickness T2 (mm) | Inner diameter D (mm) | Current interruption operating pressure (kgf/cm$^2$) |
|---|---|---|---|---|
| 6-1 | 0.1 | 0.03 | 0.1 | 4 |
| 6-2 | 0.1 | 0.03 | 0.6 | 8 |
| 6-3 | 0.1 | 0.03 | 1.2 | 12 |
| 6-4 | 0.1 | 0.03 | 1.8 | 16 |
| 6-5 | 0.1 | 0.03 | 4.0 | 30 |

As shown in Table 6, the current interruption operating pressure largely varied depending on the inner diameter D. Specifically, the current interruption operating pressure gradually increased as the inner diameter D increased. In this case, when the inner diameter D was 0.6 mm to 1.8 mm (Experimental Examples 6-2 to 6-4), the current interruption operating pressure within the proper range described above (that is, 8 kgf/cm$^2$ to 28 kg/cm$^2$) was obtained.

From the results shown in Tables 1 to 6, when the sub-disc 34 was provided with the cleavage groove 34M, the operation stability of the safety valve mechanism 30 was improved. Thus, the safety of the secondary battery was improved.

The present technology is described thus far with reference to embodiments and examples thereof; however, the present technology is not limited to the examples described in the embodiments and examples above, but various modifications may be made.

Specifically, although the cylindrical secondary battery has been described, the present invention is not limited thereto. The secondary battery may be, for example, a laminate film secondary battery, a square secondary battery, a coin-type secondary battery, or another secondary battery as long as the secondary battery is provided with a safety valve mechanism.

The case where the battery element has a wound structure has been described, but the present invention s not limited thereto. The battery element may have another structure such as a laminated structure.

The secondary battery (lithium ion secondary battery) in which the battery capacity is obtained using the lithium absorption phenomenon and the lithium release phenomenon and the secondary battery (lithium metal secondary battery) in which the battery capacity is obtained using the lithium precipitation phenomenon and the lithium dissolution phenomenon have been described, but the present invention is not limited thereto. The secondary battery may be, for example, a secondary battery in which the battery capacity is represented by the sum of the capacitance using the lithium absorption phenomenon and the lithium release phenomenon and the capacitance using the lithium precipitation phenomenon and the lithium dissolution phenomenon by causing the capacitance of the negative electrode material capable of absorbing and releasing lithium to be smaller than the capacitance of the positive electrode.

Moreover, the description has been given to the case where lithium is used as the electrode reactant. However, the electrode reactant is not limited thereto. The electrode reactant may be, for example, another Group 1 element such as sodium or potassium in the long periodic table, a Group 2 element such as magnesium or calcium in the long periodic table, or another light metal such as aluminum. Alternatively, the electrode reactant may be an alloy including one or two or more of the foregoing series of elements.

The effects described in the present description are illustrative and non-limiting, and the technology may have effects other than those described in the present description.

The present technology is described below in further detail according to an embodiment of the present disclosure.

(1)

A secondary battery, including:

a battery element including a positive electrode, a negative electrode, and an electrolytic solution;

a housing member having an open end and housing the battery element; and a safety valve mechanism attached to the housing member and closing the open end, wherein the safety valve mechanism includes a closing member closing the open end and a coupling member disposed between the battery element and the closing member, electrically coupled to each of a wound electrode body and the closing member, and having a coupling portion physically coupled to the closing member and a groove provided in at least part of a peripheral region of the coupling portion.

(2)

The secondary battery according to (1), wherein the groove has an annular shape surrounding the coupling portion.

(3)

The secondary battery according to (2), wherein the groove has a ring shape.

(4)

The secondary battery according to any one of (1) to (3), wherein the coupling member has a first surface located close to the battery element and a second surface located close to the closing member, and the groove is provided in at least one of the first surface and the second surface.

(5)

The secondary battery according to any one of (1) to (4), wherein the closing member has a protrusion protruding toward the coupling member, the safety valve mechanism further includes an intermediate member disposed between the closing member and the coupling member and having an opening for the protrusion to pass through, the coupling member is physically coupled to the protrusion at the coupling portion, and the groove is provided in a region of the coupling member, the region corresponding to the opening.

(6)

The secondary battery according to any one of (1) to (5), wherein a first thickness of the coupling member at a portion where the groove is not provided is 0.05 mm or more and 0.30 mm or less.

(7)

The secondary battery according to any one of (1) to (6), wherein a second thickness of the coupling member at a portion where the groove is provided is 0.02 mm or more and 0.07 mm or less.

(8)

The secondary battery according to any one of (1) to (7), wherein a ratio of the second thickness of the coupling member at the portion where the groove is provided to the first thickness of the coupling member at the portion where the groove is not provided (the second thickness/the first thickness) is 0.2 or more and 0.7 or less.

(9)

The secondary battery according to any one of (1) to (8), wherein the groove has a ring shape, and an inner diameter of the groove is 0.6 mm or more and 1.8 mm or less.

(10)

The secondary battery according to any one of (1) to (9), wherein the groove has a ring shape, and an operating pressure of the safety valve mechanism calculated using a multiple correlation equation shown in equation (1) below is 8 kgf/cm$^2$ or more and 28 kgf/cm$^2$ or less.

$$P=40\times T1\times 6.7\times D+400\times T2-12 \quad (1)$$

(where P is the operating pressure (kg/cm$^2$) of the safety valve mechanism, T1 is a first thickness (mm) of the coupling member at a portion where the groove is not provided, D is an inner diameter m) of the groove, and T2 is a second thickness (mm) of the coupling member at a portion where the groove is provided.)

(11)

The secondary battery according to any one of (1) to (10), wherein the secondary battery is a lithium ion secondary battery, (12)

A battery pack including:

the secondary battery according to any one of (1) to (11);

a controller that is configured to control operation of the secondary battery; and a switch section that is configured to switch the operation of the secondary battery in accordance with an instruction from the controller.

(13)

An electric vehicle including:

the secondary battery according to any one of (1) to (11);

a convertor that is configured to convert electric power supplied from the secondary battery into drive power;

a drive section that is configured to operate in accordance with the drive power; and a controller that is configured to control operation of the secondary battery.

(14)

An electric power storage system including:

the secondary battery according to any one of (1) to (11);

one or more electrical appliances that are supplied with electric power from secondary battery; and a controller that is configured to control electric power supply from the secondary battery to the one or more electrical appliance.

(15)

An electric power tool including:

the secondary battery according to any one of (1) to (11); and a movable section that is supplied with electric power from the secondary battery.

(16)

An electronic apparatus including the secondary battery according to any one of (1) to (11) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery, comprising:
a battery element including a positive electrode, a negative electrode, and an electrolytic solution;
a housing member having an open end and configured to accommodate the battery element; and
a safety valve mechanism attached to the housing member and configured to close the open end, wherein
the safety valve mechanism includes
a closing member configured to close the open end, and
a coupling member disposed between the battery element and the closing member,
wherein the coupling member is electrically coupled to both of the battery element and the closing member,
wherein the coupling member has a coupling portion physically coupled to the closing member,
wherein a groove is provided in at least part of a peripheral region of the coupling portion,
wherein the coupling member has a first thickness at a portion where the groove is not provided and a second thickness at a portion where the groove is provided,
wherein the second thickness is 0.02 mm or more and 0.07 mm or less,
wherein the groove has an annular shape surrounding the coupling portion, and
wherein an operating pressure of the safety valve mechanism calculated by an equation (1) is 8 kgf/cm$^2$ or more and 28 kgf/cm$^2$ or less, $$P = 40 \times T1 + 6.7 \times D + 400 \times T2 - 12 \qquad (1)$$

where P represents the operating pressure (kgf/cm$^2$) of the safety valve mechanism, T1 represents the first thickness (mm), D represents an inner diameter (mm) of the groove, and T2 represents the second thickness (mm),
wherein the closing member has a protrusion protruding toward the coupling member,
the safety valve mechanism further includes an intermediate member disposed between the closing member and the coupling member and having a central opening for the protrusion to pass through and a plurality of openings surrounding the central opening,
the coupling member is physically coupled to the protrusion at the coupling portion, and
the groove is provided inside a region corresponding to the central opening in a plan view.

2. The secondary battery according to claim 1, wherein the groove has a ring shape.

3. The secondary battery according to claim 1, wherein the coupling member has
a first surface located close to the battery element and
a second surface located close to the closing member, and
wherein the groove is provided on at least one of the first surface and the second surface.

4. The secondary battery according to claim 1, wherein the first thickness of the coupling member is 0.05 mm or more and 0.30 mm or less.

5. The secondary battery according to claim 1, wherein a ratio of the second thickness of the coupling member to the first thickness of the coupling member (the second thickness/the first thickness) is 0.2 or more and 0.7 or less.

6. The secondary battery according to claim 1, wherein the groove has a ring shape, and
an inner diameter of the groove is 0.6 mm or more and 1.8 mm or less.

7. The secondary battery according to claim 1, wherein the secondary battery includes a lithium ion secondary battery.

8. A battery pack, comprising:
the secondary battery according to claim 1;
a controller configured to control operation of the secondary battery; and
a switch configured to switch the operation of the secondary battery in accordance with an instruction from the controller.

9. An electric vehicle comprising:
the secondary battery according to claim 1;
a converter configured to convert electric power supplied from the secondary battery into drive power;
a driver configured to operate in accordance with the drive power; and
a controller configured to control operation of the secondary battery.

10. An electric power storage system comprising:
the secondary battery according to claim 1;
one or more electrical appliances that are supplied with electric power from the secondary battery; and
a controller configured to control electric power supply from the secondary battery to the one or more electrical appliances.

11. An electric power tool comprising:
the secondary battery according to claim 1; and
a movable section configured to be supplied with electric power from the secondary battery.

12. An electronic apparatus comprising the secondary battery according to claim 1 as an electric power supply source.

* * * * *